United States Patent
Stoops et al.

(10) Patent No.: US 10,645,225 B1
(45) Date of Patent: May 5, 2020

(54) SYSTEMS AND METHODS RELATING TO CHAT INTERFACES

(71) Applicant: Genesys Telecommunications Laboratories, Inc., Daly City, CA (US)

(72) Inventors: Daniel Stoops, Powell, OH (US); Cliff Bell, Kalispell, MT (US)

( * ) Notice: Subject to any disclaimer, the term of this patent is extended or adjusted under 35 U.S.C. 154(b) by 0 days.

(21) Appl. No.: 16/564,681

(22) Filed: Sep. 9, 2019

(51) Int. Cl.
*H04M 3/51* (2006.01)
*G06T 13/80* (2011.01)
*H04L 12/58* (2006.01)
*G06T 11/40* (2006.01)
*G06T 11/20* (2006.01)
*G06T 3/00* (2006.01)

(52) U.S. Cl.
CPC ......... *H04M 3/5183* (2013.01); *G06T 3/0093* (2013.01); *G06T 11/203* (2013.01); *G06T 11/40* (2013.01); *G06T 13/80* (2013.01); *H04L 51/02* (2013.01); *H04L 51/10* (2013.01); *H04M 2203/401* (2013.01)

(58) Field of Classification Search
CPC .......... H04M 3/5138; H04M 2203/401; G06T 3/0093; G06T 11/203; G06T 11/40; G06T 13/80; H04L 51/02; H04L 51/10
USPC ................................................. 379/265.09
See application file for complete search history.

(56) References Cited

U.S. PATENT DOCUMENTS

| | | | | |
|---|---|---|---|---|
| 2018/0005215 | A1* | 1/2018 | Delaney | H04L 51/02 |
| 2018/0367483 | A1* | 12/2018 | Rodriguez | H04L 65/60 |

* cited by examiner

*Primary Examiner* — Quynh H Nguyen

(57) ABSTRACT

A method for orchestrating a chat interaction with a customer and multiple sources that includes providing an animation library that includes conversational states, graphic stills corresponding to respective ones of the conversational states, animation templates, and source-based modifications corresponding to respective ones of the multiple sources. The method may include generating a source-informative animation by: determining a source of a chat message; determining a conversational state for the chat message; selecting a graphic still for the message; selecting an animation template for the chat message based on the selected graphic still; selecting a source-based modification that corresponds to the source; and modifying the animation template pursuant to the source-based modification so to generate the source-informative animation. The method may include sending a signal to the customer configured to generate thereon a chat interface having the chat message and source-informative animation.

20 Claims, 12 Drawing Sheets

SYSTEMS AND METHODS RELATING TO CHAT INTERFACES

BACKGROUND

The present invention generally relates to telecommunications systems. More particularly, but not by way of limitation, the present invention pertains to contact centers and systems and methods for facilitating chat communications.

SUMMARY

Embodiments of the present invention may include processor-implemented methods and/or systems for orchestrating a chat interaction with a customer, wherein, during the chat interaction, chat messages originating from multiple sources are sent to the customer. For example, the method may include the step of providing an animation library that includes: conversational states, each of the conversational states comprising an emotion classification by which the chat messages originating from the multiple sources are classified; graphic stills corresponding to respective ones of the conversational states; animation templates, each animation template including one of the graphic stills morphing into another one of the graphic stills; and source-based modifications corresponding to respective ones of the multiple sources. Each of the source-based modifications may include instructions for modifying the animation templates to make a modified one of the animation templates for one of the multiple sources unique in appearance relative to modified ones of the animation templates for the other of the multiple sources. In response to a creation of a first chat message for sending to the customer, the method may include the step of generating a first source-informative animation using the following steps: determining a source of the first chat message, wherein the source determined for the first chat message is designated as a first source; determining a conversational state for the first chat message, wherein the conversational state determined for the first chat message is designated as a first conversational state; selecting a graphic still for the first chat message based on which of the graphic stills corresponds with the first conversational state, wherein the graphic still selected for the first chat message is designated as a first graphic still; selecting an animation template for the first chat message based at least in part on the selection of the first graphic still, wherein the animation template selected for the first chat message is designated as a first animation template; selecting a source-based modification that corresponds to the first source, wherein the source-based modification that corresponds to the first source is designated as a first source-based modification; and modifying the first animation template pursuant to the first source-based modification so to generate the first source-informative animation. The method may further include the step of sending a signal to a customer device of the customer configured to generate thereon a first chat interface, the first chat interface comprising a display of the first chat message and the first source-informative animation.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
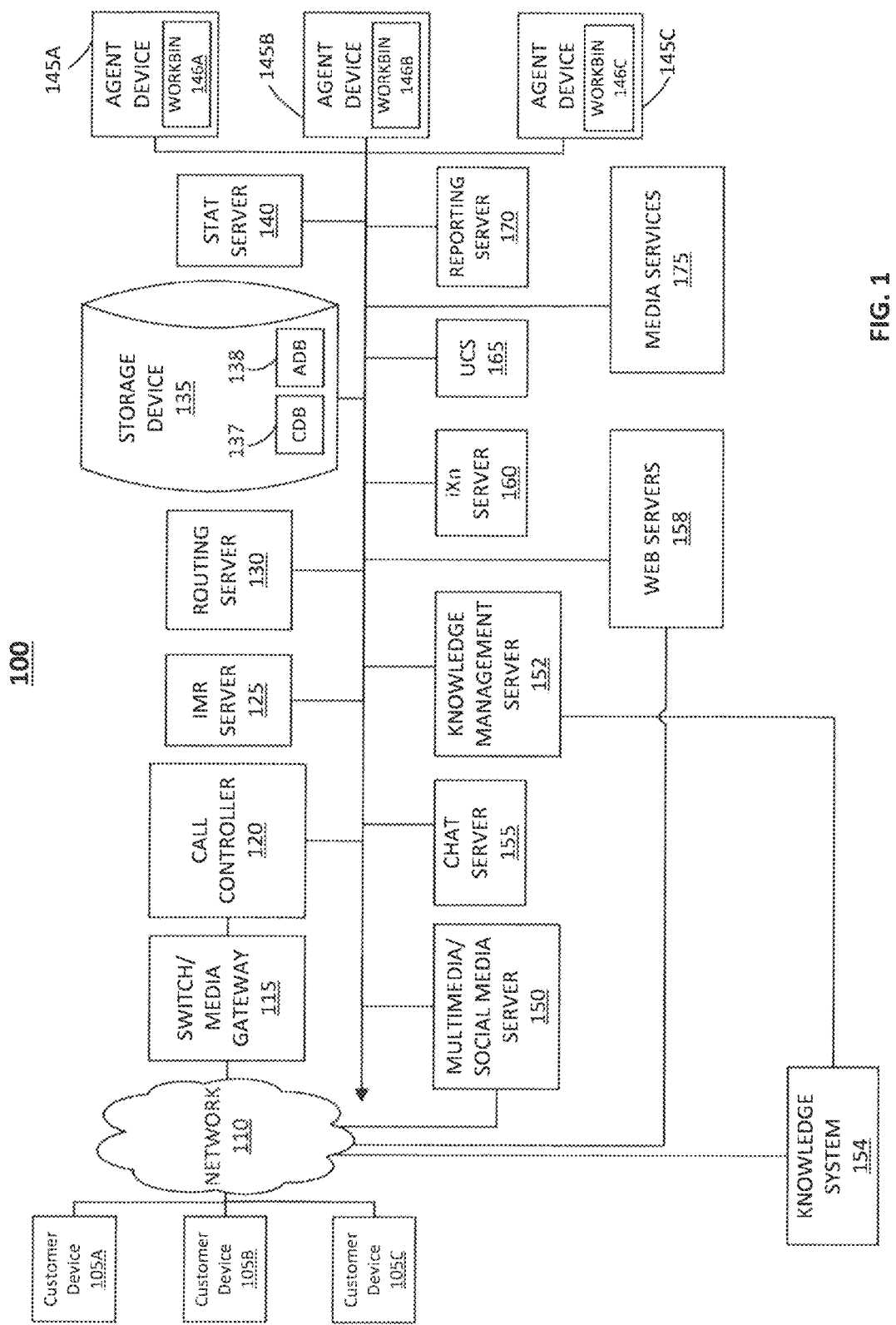
FIG. 1 is a block diagram of a contact center according to embodiments of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present invention relates to telecommunication systems and, more particularly, though without limitation, to contact centers. By way of general background, contact centers are staffed with employees or agents (referred to herein as human agents or, simply, agents) who serve as an interface between an organization, such as a company or enterprise, and outside entities, such as customers and other end users (referred to herein generally as customers). For example, human agents at a contact center may assist customers in making purchasing decisions and may receive purchase orders from those customers. Similarly, human agents at contact centers may assist or support customers in solving problems with products or services provided by the organization. Such interactions between contact center agents and outside entities or customers may be conducted by speech voice (e.g., telephone calls or voice over IP or VoIP calls), video (e.g., video conferencing), text (e.g., emails and text chat), or through other media.

To remain competitive, businesses constantly strive to provide high quality customer service through such contact centers, while minimizing the costs of providing those services. One alternative is to provide live human agents to handle every interaction with customers. However, this alternative is generally prohibitively expensive, with the high costs to the business eventually being passed on to consumers in the form of increased product prices. Additionally, coordinating the availability of live human agents qualified to handle a wide variety of customer needs is complicated and time consuming, and often results in reduced customer satisfaction due to the long wait times for specialized human agents to become available. Because of this, most contact centers utilize some level of automated processes in place of live agents. In many cases this has proven to be a successful strategy, as automated processes—which may be referred to herein also as robots or, simply, as bots—can be highly efficient in handling certain types of interactions and, thus, effective at lowering cost by decreasing the need for human agents. Automated interactions also can be structured in a way that optimizes efficiency and promotes repeatability. Whereas a human agent may forget to ask certain questions or follow-up on particular details, such mistakes are typically avoidable through the use of automated bots.

As a result, contact centers are increasingly relying on automated processes or bots to interact with customers, with automated chat modules or "chat bots" becoming one of the preferred ways of doing this. One of the benefits of utilizing such chat bots is that it allows contact centers to target the use of human agents for more difficult customer interactions. For example, chat bots can be effectively invoked to the handle simple tasks and requests that typically occur early in a chat conversation. While such chat conversations may eventually be transferred to a human agent, the upfront use of the chat bot means the time of human agents is not unnecessarily spent handling routine customer interactions. This type of combined usage of chat bots and human agents in single chat sessions has proven significant to the cost-effective operation of contact centers. As will be seen, embodiments of the present invention are directed to systems and methods for orchestrating the combined use of automated and human chat resources in ways that promote further efficiency and customer satisfaction.

Referring now to FIG. 1, a block diagram is presented that illustrates an embodiment of a communication infrastructure or contact center system in accordance with the present invention, which is referred to as a contact center 100. The contact center 100 may be used generally to provide various types of contact center services. As will be seen, aspects of the contact center 100 may be used to engage and manage chat conversations in which automated chat robots or bots and/or human agents communicate with customers or other end users. As will be appreciated, the contact center 100 may be used as an in-house facility to a business or enterprise for serving the enterprise in performing the functions of sales and service relative to the products and services available through the enterprise. In another aspect, the contact center 100 may be operated by a third-party service provider. According to another embodiment, the contact center 100 may operate as a hybrid system in which some components are hosted at the contact center premise while other components are hosted remotely (e.g., in a cloud-based environment). The contact center 100 may be deployed on equipment dedicated to the enterprise or third-party service provider, and/or deployed in a remote computing environment such as, for example, a private or public cloud environment with infrastructure for supporting multiple contact centers for multiple enterprises. It should further be appreciated that the various components of the contact center may also be distributed across various geographic locations and computing environments and not necessarily contained in a single location, computing environment, or even computing device.

In accordance with the exemplary embodiment of FIG. 1, the components or modules of the contact center 100 may include: a plurality of customer devices 105A, 105B, 105C; a communications network 110 (also referred to simply as network 110); a switch/media gateway 115; a call controller 120; an interactive media response (IMR) server 125; a routing server 130; a storage device 135; a statistics or stat server 140; a plurality of agent devices 145A, 145B, 145C that include workbins 146A, 146B, 146C, respectively; a multimedia/social media server 150; a knowledge management server 152 coupled to a knowledge system 154; a chat server 155, web servers 158; an interaction (iXn) server 160; a universal contact server (UCS) 165; a reporting server 170; and media services 175. As will be seen, the contact center 100 manages resources (e.g., personnel, computers, telecommunication equipment, etc.) to enable delivery of services via telephone, email, chat, or other communication mechanisms. Such services may vary depending on the type of contact center and range from customer service to help desk, emergency response, telemarketing, order taking, etc.

For example, in accordance with an embodiment, customers or other end users desiring to receive services from the contact center 100 initiate inbound communications (e.g., telephony calls, emails, chats, etc.) to the contact center 100 via a customer device 105. While FIG. 1 shows three such customer devices—i.e., customer devices 105A, 105B, and 105C—it should be understood that any number may be present. Each of the customer devices 105 may be a communication device conventional in the art, such as a telephone, wireless phone, smart phone, personal computer, electronic tablet, or laptop, to name some non-limiting examples. In general, the customer devices 105 are used by customers to initiate, manage, and respond to telephone calls, emails, chats, text messages, web-browsing sessions, and other multi-media transactions in accordance with any of the functionality described herein. For example, a customer may use a customer device 105 to contact the contact center 100 by way of a chat channel with the text being transmitted to a chat bot or human agent. A response from the chat bot or human agent may be generated and delivered to the customer device 105 as text.

Inbound and outbound communications from and to the customer devices 105 may traverse the network 110, with the nature of network depending on the type of customer device being used and form of communication. As an example, the network 110 may include a communication network of telephone, cellular, and/or data services and may also comprise a private or public switched telephone network (PSTN), local area network (LAN), private wide area network (WAN), and/or public WAN such as the Internet. The network 110 may also include a wireless carrier network including a code division multiple access (CDMA) network, global system for mobile communications (GSM) network, or any wireless network/technology conventional in the art, including but not limited to 3G, 4G, LTE, etc.

Embodiments of the contact center 100 may include a switch/media gateway 115 coupled to the network 110 for receiving and transmitting telephony calls between the customers and the contact center 100. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection between the calling customer and the agent telephony device, by establishing, for example, a connection between the customer's telephony device and the agent telephony device.

In an embodiment, the switch is coupled to a call controller 120 which, for example, serves as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the call center system 100 in processing the interaction.

Embodiments of the contact center 100 may include an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center 100 resource.

For example, if the communication is to be routed to an agent, the call controller 120 may interacts with the routing server (also referred to as an orchestration server) 130 to find an appropriate agent for processing the interaction with the particular customer. The selection of an appropriate agent for routing an inbound customer interaction may be based, for example, on a routing strategy employed by the routing server 130, and further based on stored information about the customer and agents (which, as described more below, may be maintained in customer and agent databases on the storage device 135) and other routing parameters provided, for example, by the statistics server 140, which aggregates data relating to the performance of the call center 100. The routing server 130, for example, may query such data via an ANI. Thus, in general, the routing server 130 may query data relevant to an incoming interaction for facilitating the routing of that interaction to the most appropriate contact center.

Regarding data storage, the contact center 100 may include one or more mass storage devices—represented generally by the storage device 135—that stores one or more databases of data deemed relevant to the functioning of the contact center 100. For example, the storage device 135 may store customer data that is maintained in a customer database (also CDB) 137. Customer data may include customer profiles, contact information, service level agreement (SLA), interaction history (e.g., details of each previous interaction with a customer, including nature of previous customer contacts, reason for the interaction, disposition data, wait time, handle time, and actions taken by the contact center to resolve customer issues). As another example, the storage device 135 may store agent data in an agent database (also ADB) 138. Agent data may include agent availability, profiles, schedules, skills, etc. More generally, it should be understood that, unless otherwise specified, the storage device 135 is configured to include databases and/or store data related to any of the types of information described herein, with those databases and/or data being accessible to the other modules or servers of the contact center 100 in ways that facilitate the functionality described herein. For example, the servers or modules of the contact center 100 may query the databases for retrieving particular data stored therewithin as well as transfer data to the databases for storage thereon. The storage device 135, for example, may take the form of a hard disk, disk array, or any other storage medium as is conventional in the art. The storage device 135 may be included as part of the contact center 100 or operated remotely by a third party. The databases, for example, may be Cassandra or any NoSQL database. The databases may also be a SQL database and be managed by any database management system, such as, for example, Oracle, IBM DB2, Microsoft SQL server, Microsoft Access, PostgreSQL, etc., to name a few non-limiting examples.

In an embodiment, the agent devices 145 are configured to interact with the various components and modules of the call center 100 in ways that facilitate the functionality described herein. For example, the agent devices 145 may include a telephone adapted for regular telephone calls, VoIP calls, etc. The agent device 145 may further include a computer for communicating with one or more servers of the contact center 100 and performing data processing associated with contact center operations, as well as for interfacing with customers via voice and other multimedia communication mechanisms pursuant to described functionality. While FIG. 1 shows three such agent devices—i.e., agent devices 145A, 145B and 145C—it should be understood that any number may be present.

Once it is determined that an inbound communication should be handled by a human agent, functionality within the routing server 130 may select an agent from those available for routing the communication thereto. As already discussed, this selection may be based on which agent is best suited for handling the inbound communication. Once the appropriate agent is selected, the contact center 100 forms a connection between the customer device 105 and the agent device 145 that corresponds to the selected agent. As part of this connection, information about the customer and/or the customer's history may be provided to the selected agent via his/her agent device 145. This information generally includes data that may aid the selected agent to better service the customer.

According to an embodiment, the contact center 100 may include a multimedia/social media server 150 for engaging in media interactions other than voice interactions with the customer devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

Embodiments of the contact center 100 may include a knowledge management server 152 for facilitating interactions between customers operating the customer devices 105 and a knowledge system 154. The knowledge system 154 may be included as part of the contact center 100 or operated remotely by a third party. In general, the knowledge system 154 may be a computer system capable of receiving questions or queries and providing answers in response. The knowledge system 154 may include an artificially intelligent computer system capable of answering questions posed in natural language by retrieving information from information sources such as encyclopedias, dictionaries, newswire articles, literary works, or other documents submitted to the knowledge system 154 as reference materials, as is known in the art. As an example, the knowledge system 154 may be embodied as IBM Watson®, though other types of systems also may be used. Additional details of the knowledge management server and knowledge system are provided in U.S. application Ser. No. 14/449,018, filed on Jul. 31, 2014, entitled "System and Method for Controlled Knowledge System Management," the content of which is incorporated herein by reference.

According to an embodiment, the contact center 100 may include a chat server 155 for conducting and managing electronic chat communications with customers operating customer devices 105. As will be seen, chat communications may be conducted by the chat server 155 in such a way that a customer communicates with both automated systems, which may also be referred to as chat bots, as well as human agents, which may also be referred to simply as agents. According to an embodiment, the chat server 155 may be configured to implement and maintain chat conversations, generate chat transcripts, and determine whether a chat communication is completed (e.g., based on timeout or by a customer closing a chat window). In an embodiment, the chat server 155 may also operate as a chat orchestration server, dispatching actual chat conversations among the chat bots or available human agents. The processing logic of the chat server 155 may be rules driven, and leverage, for example, intelligent workload distribution protocols and various business rules for routing communications. The chat server 155 further may implement, manage and facilitate user interfaces (also UIs) associated with the chat feature, including those UIs generated at either the customer device 105 or the agent device 145. Further, the chat server 155 may orchestrate and implement chats conducted by both human agents and automated chat bots. According to an embodiment, the chat server 155 is configured to transfer chats within a single chat session with a particular customer between automated and human sources such that, for example, a chat session transfers from a chat bot to a human agent or from a human agent to a chat bot.

The chat server 155 may also be coupled to the knowledge management server 152 and the knowledge systems 154 for receiving suggestions and answers to queries posed by customers during an automated chat, providing links to knowledge articles, or the like. Additionally, the chat server 155 may be configured to facilitate (e.g., supervise and coordinate) self-learning by certain of the chat bots. For example, prior to characteristics of individual chat bots being modified, the chat server 155 may determine whether the feedback from customer that precipitated the modification is suspicious or malicious (e.g., by searching for or identifying key words or phrases, and/or flagging potential issues for review by an agent). Although the chat server 155 is depicted in the embodiment of FIG. 1 as being a separate server component, a person of skill in the art should recognize that functionalities of the chat server 155 may be incorporated into other servers, such as, for example, the multimedia/social media server 150 or the IMR server 125.

According to an embodiment, the web servers 155 may include social interaction site hosts for a variety of known social interaction sites to which a customer may subscribe, such as Facebook, Twitter, Instagram, etc., to name a few non-limiting examples. In an embodiment, although web servers 155 are depicted as part of the contact center 100, the web servers 155 may also be provided by third parties and/or maintained outside of the contact center premise. The web servers 155 may also provide web pages for the enterprise that is being supported by the contact center 100. Customers may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In addition, embodiments of the call center 100 may be configured to manage deferrable interactions or activities (also referenced simply as deferrable activities) and the routing thereof to human agents for completion. As should be understood, deferrable activities include back-office work that can be performed off-line, examples of which include responding to emails, letters, attending training, and other activities that do not entail real-time communication with a customer. To do this, the interaction (iXn) server 160 is configured to interact with the routing server 130 for selecting an appropriate agent to handle each of the deferable activities. Once assigned to a particular agent, the deferable activity is pushed to that agent, for example, appearing on the agent device 145 of the selected agent. As an example, the deferable activity appear in a workbin 146 as a task for the selected agent to complete. The functionality of the workbin 146 may be implemented via any conventional data structure, such as, for example, a linked list, array, etc. Each of the agent devices 145 may include a workbin 146, thus, workbins 146A, 146B, and 146C may be maintained in the agent devices 145A, 145B, and 145C, respectively. As an example, a workbin 146 may be maintained in the buffer memory of the corresponding agent device 145.

According to an embodiment, the contact center 100 may include a universal contact server (UCS) 165, which is configured to retrieve information stored in the customer database 137 and direct information for storage therein. For example, the UCS 165 may be utilized as part of the chat feature to facilitate maintaining a history on how well chats for a particular customer were handled, which then may be used as a reference for future chat communications. The UCS 165 also may be configured to facilitate maintaining a history of customers' preferences regarding media channels, such as instances in which chat communications are acceptable and instances in which customers prefer alternate media channels. Additionally, the UCS 165 may be configured to record an interaction history for each customer, capturing and storing data regarding comments from agents, customer communication history, and the like. Each of these data types may be stored on the customer database 137 or on other modules as described functionality requires.

Exemplary embodiments of the contact center 100 may further include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent, administrator, contact center application, etc.).

According to an embodiment, the media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

The various components, modules, and/or servers of FIG. 1 (as well as the other figures included herein) may each include one or more processors executing computer program instructions and interacting with other system components for performing the various functionalities described herein. The computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention. Further, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc. Access to and control of the components of the contact system 100 may be affected through user interfaces (UIs) which may be generated on the customer devices 105 and/or the agent devices 145. As noted above, the contact center 100 may operate as a hybrid system in which some or all components are hosted remotely, such as in a cloud-based environment. For the sake of convenience, aspects of embodiments of the present invention may be described herein with respect to providing modular tools from a cloud-based environment to components housed on-premises.

Figure 2:
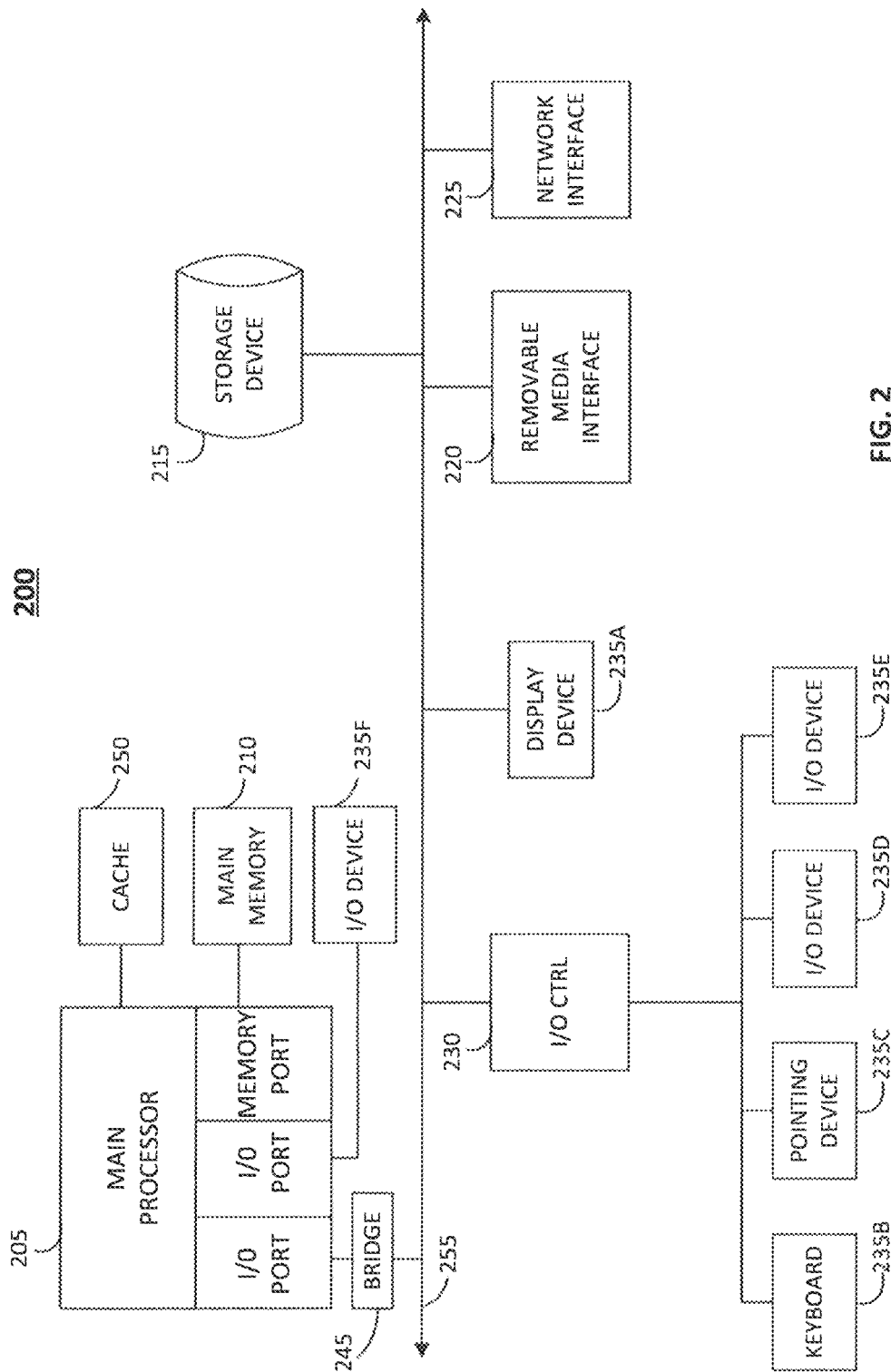
FIG. 2 is a block diagram of a computing device according to embodiments of the present invention.

Turning now to FIG. 2, an exemplary computing device is shown that may be used to implement aspects of the present invention. As should be appreciated by a person of skill in the art, each of the various servers, controls, switches, gateways, engines, and/or modules (collectively referred to also as servers) in the described figures may be implemented via hardware or firmware (e.g., ASIC). Each of the various servers may be a process or thread, running on one or more processors, in one or more computing devices, such as, for example, the computing device 200 of FIG. 2, executing computer program instructions and interacting with other system components for performing the various functionalities described herein. A person of skill in the art should recognize that a computing device may be implemented via firmware (e.g., an application-specific integrated circuit), hardware, or a combination of software, firmware, and hardware. Further, it should be appreciated that, without departing from the scope of the exemplary embodiments of the present invention, the functionality of various computing devices may be combined or integrated into a single computing device, or the functionality of a particular computing device may be distributed across one or more other computing devices. A server may be a software module, which may also simply be referred to as a module. For example, a module of the contact center 100 may include one or more of the included servers.

Further, the various servers may be located on a computing device on-site at the same physical location as the agents of the contact center or may be located off-site (or in the cloud) in a geographically different location, e.g., in a remote data center, connected to the contact center via a network such as the Internet. Some of the servers may be located in a computing device on-site at the contact center while others may be located in a computing device off-site, or servers providing redundant functionality may be provided both via on-site and off-site computing devices to provide greater fault tolerance. In an embodiment, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

With specific reference now to FIG. 2, a diagram is provided that illustrates an exemplary embodiment of a computing device 200 as may be employed in embodiments of the present invention. The computing device 200 may include a main processor or CPU 205 and a main memory unit 210. The computing device 200 may also include a storage device 215, a removable media interface 220, and a network interface 225. The computing device 200 may include one or more input/output (I/O) devices 235, which in the embodiment shown includes an I/O controller 230, a display device 235A, a keyboard 235B, and a pointing device 235C (e.g., a mouse). The storage device 215 may include, without limitation, storage for an operating system and software. The computing device 200 may also include additional optional elements, such as a memory port 240, a bridge 245, one or more additional input/output devices 235D, 235E, 235F and a cache memory 250 in communication with the CPU 205.

The CPU 205 is any logic circuitry that responds to and processes instructions fetched from the main memory unit 210. It may be implemented, for example, in an integrated circuit, in the form of a microprocessor, microcontroller, or graphics processing unit, or in a field-programmable gate array (FPGA) or application-specific integrated circuit (ASIC). The main memory unit 210 may be one or more memory chips capable of storing data and allowing any storage location to be directly accessed by the central processing unit 205. Though other configurations are possible, as shown in the illustrated example, the central processing unit 205 may communicate directly with the main memory 210 via a memory port 240 and indirectly with the storage device 215 via a system bus 255.

In an embodiment, the CPU 205 may include a plurality of processors and may provide functionality for simultaneous execution of instructions or for simultaneous execution of one instruction on more than one piece of data. In an embodiment, the computing device 200 may include a parallel processor with one or more cores. In an embodiment, the computing device 200 comprises a shared memory parallel device, with multiple processors and/or multiple processor cores, accessing all available memory as a single global address space. In another embodiment, the computing device 200 is a distributed memory parallel device with multiple processors each accessing local memory only. The computing device 200 may have both some memory which is shared and some which may only be accessed by particular processors or subsets of processors. The CPU 205 may include a multicore microprocessor, which combines two or more independent processors into a single package, e.g., into a single integrated circuit (IC). For example, the computing device 200 may include at least one CPU 205 and at least one graphics processing unit.

In an embodiment, a CPU 205 provides single instruction multiple data (SIMD) functionality, e.g., execution of a single instruction simultaneously on multiple pieces of data. In another embodiment, several processors in the CPU 205 may provide functionality for execution of multiple instructions simultaneously on multiple pieces of data (MIMD). The CPU 205 may also use any combination of SIMD and MIMD cores in a single device.

FIG. 2 depicts an embodiment in which the CPU 205 communicates directly with cache memory 250 via a secondary bus, sometimes referred to as a backside bus. In other embodiments, the CPU 205 communicates with the cache memory 250 using the system bus 255. The cache memory 250 typically has a faster response time than main memory 210. As illustrated, the CPU 205 communicates with various I/O devices 235 via the local system bus 255. Various buses may be used as the local system bus 255 in accordance with conventional technology. For embodiments in which an I/O device is a display device 235A, the CPU 205 may communicate with the display device 235A through an advanced graphics port (AGP). As further shown, the CPU 205 may communicate directly with I/O device 235F. Though other configurations are possible, FIG. 2 depicts an embodiment in which local buses and direct communication are mixed: the CPU 205 communicates with I/O device 235E directly while communicating with the other IO devices 235 via a local system bus 255.

A wide variety of I/O devices 235 may be present in the computing device 200. Input devices include one or more keyboards 235, mice, trackpads, trackballs, microphones, and drawing tables, to name a few non-limiting examples. Output devices include video display devices, speakers and printers. An I/O controller 230 may be used to control the one or more I/O devices, such as a keyboard 235B and a pointing device 235C (e.g., a mouse or optical pen), for example.

As illustrated, the computing device 200 may support one or more removable media interfaces 220, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. The removable media interface 220 may, for example, be used for installing software and programs. The computing device 200 may further include a storage device 215, such as one or more hard disk drives or hard disk drive arrays, for storing an operating system and other related software, and for storing application software programs. Optionally, a removable media interface 220 may also be used as the storage device. For example, the operating system and the software may be run from a bootable medium, for example, a bootable CD.

In an embodiment, the computing device 200 may include or be connected to multiple display devices 235A. As such, any of the I/O devices 235 and/or the I/O controller 230 may include any type and/or form of suitable hardware, software, or combination of hardware and software to support, enable or provide for the connection to, and use of, the multiple display devices 235A by the computing device 200. For example, the computing device 200 may include any type and/or form of video adapter, video card, driver, and/or library to interface, communicate, connect or otherwise use the multiple display devices 235A. In an embodiment, a video adapter may include multiple connectors to interface to multiple display devices 235A. In another embodiment, the computing device 200 may include multiple video adapters, with each video adapter connected to one or more of the display devices 235A. In other embodiments, one or more of the display devices 235A may be provided by one or more other computing devices, connected, for example, to the computing device 200 via a network. These embodiments may include any type of software designed and constructed to use the display device of another computing device as a second display device 235A for the computing device 200. One of ordinary skill in the art will recognize and appreciate the various ways and embodiments that a computing device 200 may be configured to have multiple display devices 235A.

An embodiment of a computing device indicated generally in FIG. 2 may operate under the control of an operating system, which controls scheduling of tasks and access to system resources. The computing device 200 may be running any operating system, any embedded operating system, any real-time operating system, any open source operation system, any proprietary operating system, any operating systems for mobile computing devices, or any other operating system capable of running on the computing device and performing the operations described herein. The computing device 200 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In an embodiment, the computing device 200 may have different processors, operating systems, and input devices consistent with the device. In other embodiments, the computing device 200 is a mobile device. Examples might include a Java-enabled cellular telephone or personal digital assistant (PDA), a smart phone, a digital audio player, or a portable media player. In an embodiment, the computing device 200 includes a combination of devices, such as a mobile phone combined with a digital audio player or portable media player.

The computing device 200 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 200 communicates with other computing devices 200 via any type and/or form of gateway or tunneling protocol such as secure socket layer (SSL) or transport layer security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines. Other types of virtualization are also contemplated, such as, for example, the network (e.g., via software defined networking (SDN)). Functions, such as functions of session border controller and other types of functions, may also be virtualized, such as, for example, via network functions virtualization (NFV).

Figure 3:
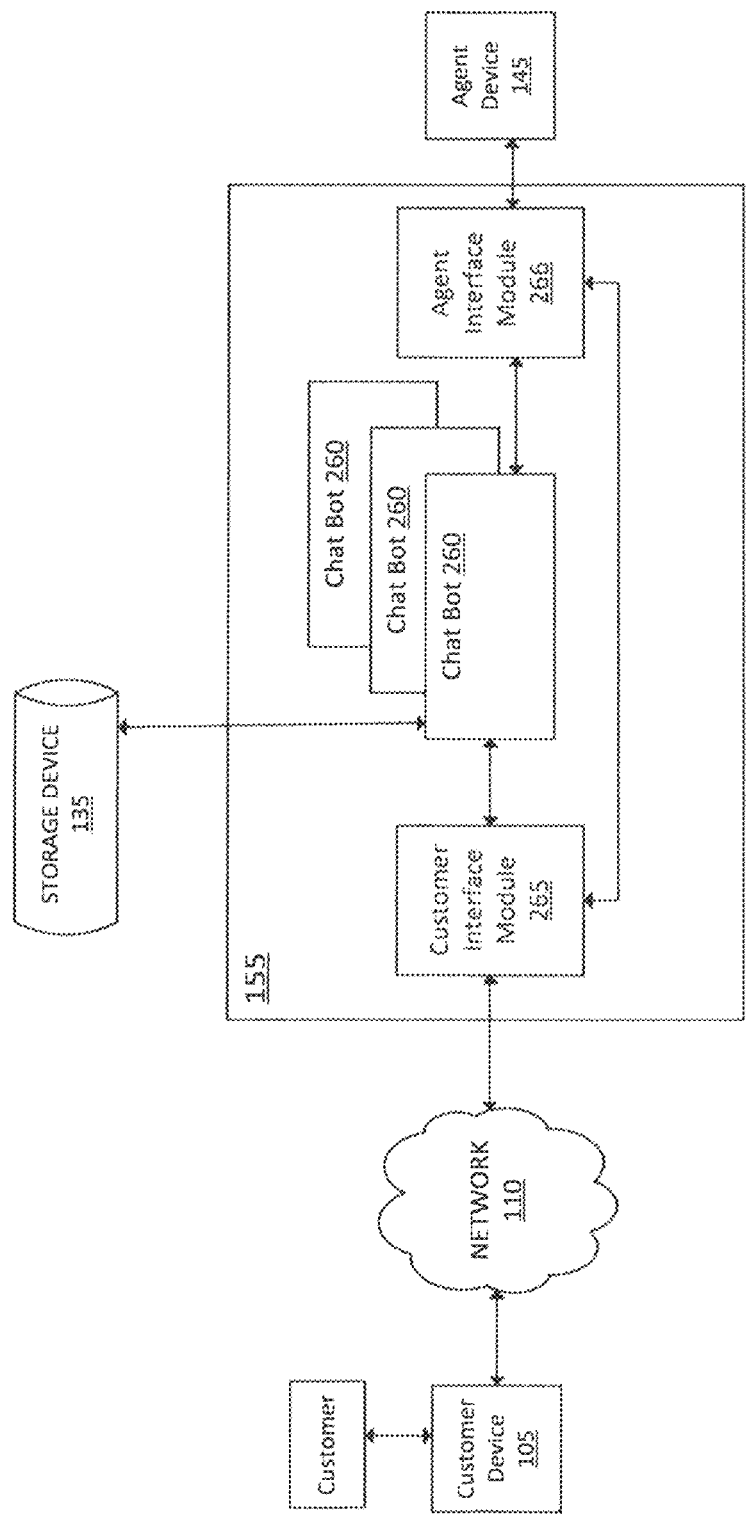
FIG. 3 is schematic block diagram showing further details of a chat server operating as part of the chat system according to embodiments of the present invention.

Referring now to FIG. 3, a more detailed schematic block diagram is provided for the chat server 155 according to an embodiment of the present invention. As already described, the chat server 155 may be coupled to (e.g., in electronic communication with) a customer device 105 operated by the customer over a data communications network 110. The chat server 155 may be operated by a business or enterprise as part of a contact center 100 (e.g., FIG. 1) for implementing and orchestrating aspects of chat conversations with the customers of the business, including both automated chats and chats with human agents. In regard to automated chats, the chat server 155 may host one or more chat automation modules or chat bots 205A-205C (collectively referenced as 205), which are configured with computer program instructions for engaging in automated chat conversations. Thus, generally, the chat server 155 implements chat functionality, including the exchange of text-based or chat communications between a customer device 105 and an agent device 145 as well as between a customer device 105 and a chat bot 260. As will be discussed more below, the chat server 155 may include a customer interface module 265 and an agent interface module 266 for generating particular UIs at the customer device 105 and the agent device 145, respectively, that are included within the chat functionality.

The chat bots 205 may operate, for example, as an executable program that can be launched according to demand for the particular chat bot. According to an embodiment, the chat server 155 may operate as an execution engine or environment for the chat bots 205, analogous to loading VoiceXML files to a media server for interactive voice response (IVR) functionality. Loading and unloading may be controlled by the chat server 155, analogous to how a VoiceXML script may be controlled in the context of an interactive voice response. The chat server 155 may provide a means for capturing and collecting user data in a unified way, similar to user data capturing in the context of IVR. Such data can be stored (e.g., in the CMR database), shared, and utilized in follow-up conversation steps, whether with the same chat bot, a different chat bot, an agent chat, or even a different media type. According to an embodiment, the chat server 155 is configured to orchestrate the sharing of data among the various chat bots 205 as interactions are transferred or transitioned over from one chat bot to another or from one chat bot to a human agent. According to an embodiment, the data captured during interaction with a particular chat bot may be transferred along with a request to invoke a second chat bot or human agent.

In an embodiment, the number of chat bots 205 may vary according to the design and function of the chat server 155 and is not limited to the number illustrated in FIG. 3. For example, different chat bots may be created to have different profiles. The profile of a particular chat bot may be used to select a chat bot with expertise for helping a customer on a particular subject control, for example, how the chat bot communicates with a particular customer. Engaging chat bots with profiles that are catered to specific types of customers may allow more effective communication with such users. For example, one chat bot may be designed or specialized to engage in a first topic of communication (e.g., opening a new account with the business 104), while another chat bot may be designed or specialized to engage in a second topic of communication (e.g., technical support for a product or service provided by the business 104), that is different from the first topic of communication. In another example, the chat bots may be configured to utilize different dialects or slang or may have different personality traits or characteristics. For example, the vocabulary of the different chat bots may be tailored to use the slang or diction of young people, elder people, people in a certain region of the country, and/or people having a certain language or ethnic background. The chat server 155 may also host a default chat bot that may be invoked at a beginning of a chat conversation if there is insufficient information about the customer to invoke a more specialized chat bot. For example, if a customer intent is unknown when the conversation initially ensues, the default chat bot may be invoked to ask questions about the customer intent. According to an embodiment, a chat bot may be customer selectable, for example, based on accent, appearance, age group, language, etc., by way of a user interface. Additionally, a chat bot may be assigned to a customer based on demographic information of the customer. According to an embodiment, a chat bot profile may be selected based on information learned from publicly available information (e.g., social media information) about a customer.

According to an embodiment, a profile of a chat bot 260 may be stored in a profile database hosted in the storage device 135. The chat bot's profile data may include, without limitation, the chat bot's personality, gender, demographics, areas of expertise, and the like. According to an embodiment, for a given subject, including receptionist and concierge services, and specialists on particular products or services (e.g., travel booking, opening accounts, etc.), there may be several different chat bots 205, each with their own personality or profile.

Each of the different chat bots 205 may be configured, in conjunction with the chat server 155, to learn and evolve their behavior and responses according to input by the customers. For example, in response to users reacting negatively to certain words, phrases, or responses, the chat bots 205 may learn to use different words, phrases, or responses. Such learning may be supervised in order to prevent undesired evolution of the personalities or profiles of the chat bots 205. For example, changes to the personalities or profiles of the chat bots 205 may be first approved or validated by human supervisors, certain keywords or phrases may be identified or flagged, and customer feedback may be analyzed. According to an embodiment, different chat bots 205 may be configured to learn from each other, in addition to learning based on customer feedback or agent feedback. For example, different chat bots 205 may be configured to communicate and exchange data with each other. In an embodiment, the different chat bots 205 may operate as a neural network for deep learning and self-learning capabilities, by exchanging data with one another.

As mentioned, the chat server 155 may include a customer interface module 265 and an agent interface module 266. As described more below, the customer interface module 265 may be configured to generating user interfaces (UIs) for display on the customer device 105 that facilitate chat communication between the customer and the chat bots 205 and the customer and human agents. The chat server 155 may include an agent interface module 266 for generating particular UIs on the agent device 145 that facilitate chat communication between an agent operating an agent device 145 and a customer operating a customer device 105. The agent interface module 266 may also generate UIs on the agent device 145 that allow an agent to monitor aspects of an ongoing chat between a chat bot 260 and a customer. The customer interface module 265 and the agent interface module 266, thus, may operate to facilitate the exchange of chat communications between the customer device 105 and one of the chat bots 205 and/or one of the agent devices 145. For example, the customer interface module 265 may transmit signals to the customer device 105 during a chat session that are configured to generated particular UIs on the customer device 105. As will be seen, those UIs generated on the customer device 105 may include the text messages sent from chat bots 205 or human agents as well as other non-text graphics that are intended to accompany the text messages, such as, emoticons or animations, for display therewith. Likewise, the agent interface module 266 may transmit signals to the agent device 145 during a chat session that are configured to generated particular UIs on the agent device 145. As will be seen, those UIs generated on the agent device 145 may include the text messages sent from customer device 105. The UIs generated on the agent device 145 also may include an interface that facilitates the selection of non-text graphics by the agent that are to accompany an outgoing text message to the customer.

According to an embodiment, the chat server 155 may be implemented in a layered architecture, with a media layer, a media control layer, and the chat bots executed by way of the IMR server 125 (similar to executing a VoiceXML on an IVR media server).

As depicted in FIG. 1, the chat server 155 may further be configured to interact with the knowledge management server 152 to query the server for knowledge information. The query, for example, may be based on a question received from the customer during a chat. Responses received from the knowledge management server 152 may then be provided to the customer as part of a chat response.

According to an embodiment, the chat server 155 may run on the same computer as the other servers of the contact center 100 depicted in FIG. 1. The chat server 155 may also run on a separate computer equipped with a processor or central processing unit (CPU) (such as that shown in FIG. 2), which executes program instructions and interacts with other system components to perform various methods and operations according to embodiments of the present invention. Thus, the chat server 155 may include a memory, which operates as an addressable memory unit for storing software instructions to be executed by the CPU. The memory may be implemented using any suitable memory device, such as a random access memory (RAM), and may additionally operate as a computer readable storage medium having non-transitory computer readable instructions stored therein that, when executed by the processor, cause the processor to control and manage an automated chat communication between the chat server 155, the customer device 105, and/or the agent device 145.

Figure 4:
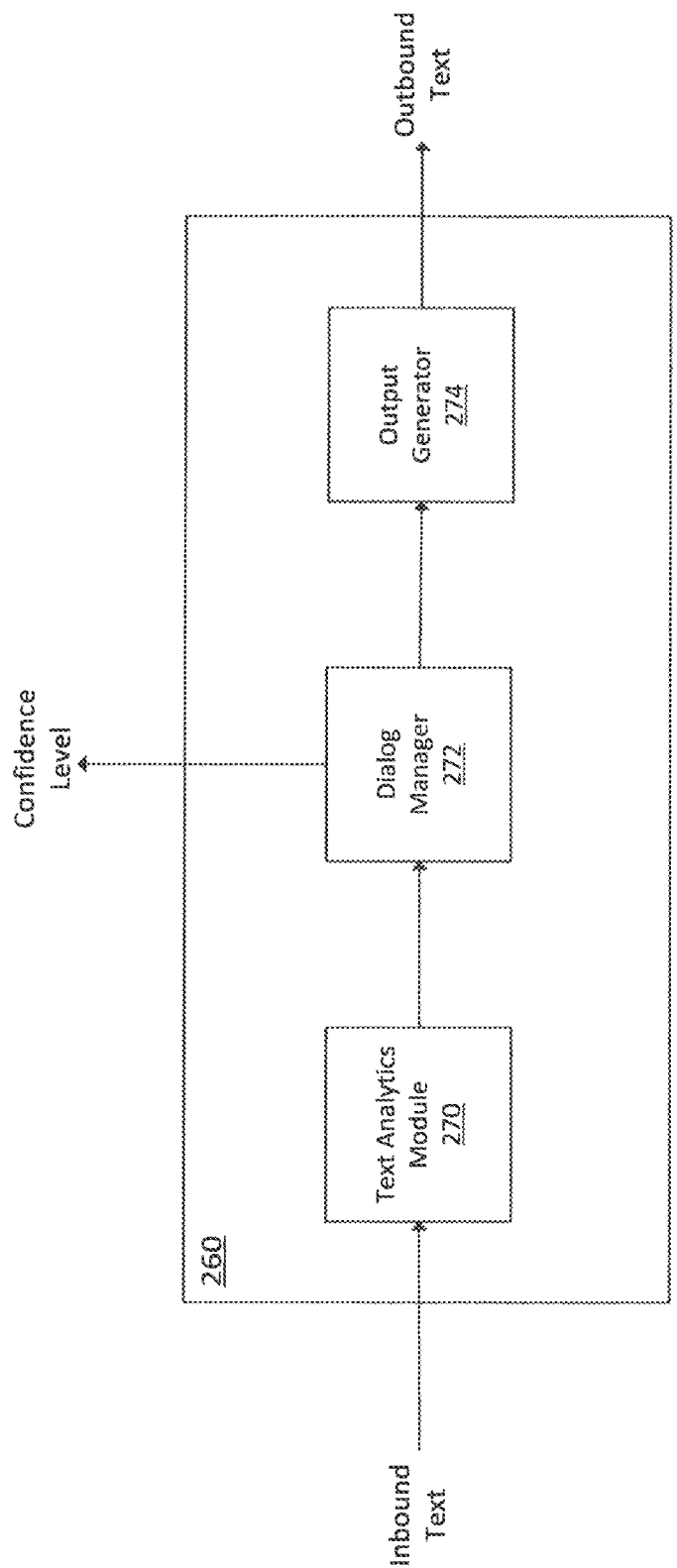
FIG. 4 is a schematic block diagram of a chat module according to embodiments of the present invention.

Referring now to FIG. 4, a more detailed block diagram is provided of an exemplary chat automation module or chat bot 260 according to an embodiment of the invention. In the illustrated embodiment, the chat bot 260 includes a text analytics module 270, a dialog manager 272, and an output generator 274. The text analytics module is configured to analyze and understand natural language. In this regard, the text analytics module may be configured with a lexicon of the language, a syntactic/semantic parser, and grammar rules for breaking a phrase provided by the customer device 105, into an internal syntactic and semantic representation. According to an embodiment, the configuration of the text analytics module depends on the particular profile associated with the chat bot. For example, certain slang words may be included in the lexicon for one chat bot, but excluded from another chat bot.

In operation, the dialog manager 272 receives the syntactic and semantic representation from the text analytics module 270 and manages the general flow of the conversation based on a set of decision rules. In this regard, the dialog manager 272 maintains history and state of the conversation, and generates an outbound communication based on the history and state. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script, and outputs the response to the output generator 274. According to an embodiment, the dialog manager 272 may also be configured to compute a confidence level for the selected response and provide the confidence level to the agent device 145. According to an embodiment, every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, assignment for a human agent to assist (e.g., by disambiguating input from the customer), and the like.

The confidence level may be utilized to assist the system with deciding whether the detection, analysis, and response to the customer input is appropriate or sufficient, or whether a human agent should be involved. For example, a threshold confidence level may be assigned to invoke human agent intervention, based on one or more business rules. According to an embodiment, confidence level may be determined based on customer feedback. For example, in response to detecting a negative reaction from a customer to an action or response taken by the chat bot, the confidence level may be reduced. Conversely, in response to detecting a positive reaction from a customer, the confidence level may be increased.

According to an embodiment, the response selected by the dialog manager 272 may include information provided by the knowledge management server 152. The information may be, for example, a link to a knowledge article that the chat bot may want to recommend to the customer in response to a question posed by the customer.

In an embodiment, the output generator 274 takes the semantic representation of the response provided by the dialog manager 272, maps the response to a chat bot profile or personality (e.g., by adjusting the language of the response according to the dialect, vocabulary, or personality of the chat bot), and outputs an outbound text to be displayed at the customer device 105. The output text may be intentionally presented such that the customer interacting with a chat bot is unaware that it is interacting with an automated process as opposed to a human agent. As will be seen, in accordance with other embodiments, the output text may be linked with visual representations, such as emoticons or animations, integrated into the customer's user interface.

In proceeding with the description of the present invention with respect to FIGS. 5-14, a note will first be made about the reference of system components—e.g., modules, servers, components, and other systems—that have already been introduced in the previous figures. Whether or not such subsequent references include the corresponding numerical identifiers of FIGS. 1-4, it should be understood that the reference incorporates the previously discussed examples and, unless otherwise specifically limited, may be implemented in accordance with those examples or other conventional technology capable of fulfilling the desired functionality, as would be appreciated by one of ordinary skill in the art. Thus, for example, subsequent mention of a "contact center" should be understood as referring to the exemplary "contact center 100" of FIG. 1 and/or other conventional technology for implementing a contact center. As additional examples, a subsequent mention below to a "customer device", "storage device", "agent device", "chat server", "computing device", "chat bot", or "customer interface module" should be understood as referring to the exemplary "customer device 105", "storage device 135", "agent device 145", "chat server 155", "computing device 200", "chat bot 260", or "customer interface module 265", respectively, of FIGS. 1-4, as well as conventional technology for fulfilling the same functionality.

With reference to FIGS. 5-14, further embodiments of the present invention are presented that facilitate blended chat interactions (or, simply, "blended interactions"). As used herein, a blended interaction is a chat session in which the customer communicates with a plurality of different entities or intelligence-types when chatting with a contact center. These different entities with which customers may receive chat messages will be referred to chat sources (or, simply, sources) and, for example, may include chat bots and/or human agents. Thus, during a blended interaction, a customer interacts or chats with multiple different sources, which may include one or more chat bots and/or one or more human agents.

A blended chat interaction, for example, may unfold as follows. A customer visiting an enterprise website may initiate the interaction by engaging a chat feature. Initially, the engagement with the customer via the chat feature is handled by a first chat bot, such as a chat bot configured to provide an initial search function. Depending on how this first engagement proceeds, the chat session with the customer may be classified as one that escalates to a human agent. The chat is then transferred from the first chat bot to a first human agent, and, once the chat with the first human agent begins, the chat becomes a blended interaction. Continuing with the example, after interacting with the customer, the first human agent may transfer the chat to a second chat bot, such as one that is configured to complete an action that concludes the chat session. Alternatively, the first human agent may transfer the chat to a second human agent after it is determined that interaction includes subject matter that the second human agent is more adept at handling. Then to conclude the interaction, the second human agent may transfer the chat to the second chat bot, or, for example, a third chat bot that is configured to handle some other possible action required by the customer. In all cases, the interaction with any two of the chat sources qualifies the chat session as being a blended interaction.

Within this general definition, it should be understood that specific types of blended interactions may be differentiated. For example, one type of blended interaction is defined to include customer interaction with at least one automated chat module or chat bot and at least one human agent. In alternative embodiments, a type of blended interaction is defined as a single chat session in which the customer interacts with multiple chat bots, but no human agents. Similarly, another type of blended interaction is defined as including customer interaction with multiple different human agents, but no chat bots.

The use of blended interactions can have several advantages for the contact center. First, it has been shown in research that single contact resolution is a leading indicator for customer satisfaction when contacting contact centers. From the point of view of the contact center, utilizing different sources over the course of that single contact can improve the likelihood of arriving at that resolution. Second, the utilization of automated resources or chat bots can increase efficiency and lower operating costs for contact centers. Contact centers can leverage blended interactions to increase reliance on chat bots, while still maintaining customer satisfaction.

However, in the use of blended interactions, problems often arise with providing customers with consistent and engaging chat interfaces as they communicate with the different sources. Conventional interfaces used in such interactions typically make customers feel as if they are being randomly shuffled about from one entity to another, with customers becoming aggravated as they realize they are interacting with different chat sources but unsure as to when the transfers between those sources are taking place. Because of this, there is value in finding solutions that allow contact centers to utilize different sources during blended chat interactions in ways that are more customer friendly.

As will be seen, the present invention achieves this objective through the use of particular user interfaces (or UIs)—or as also used herein, chat interfaces—generated on the customer device that mitigate the impression of transferring the customer across various sources. Instead of the prevalent conventional interfaces—such as the disjointed feel of the "text only" bot handing off to a human agent—the present invention includes blended graphics that promote continuity between different sources. In accordance with exemplary embodiments, consistent visual elements are provided that enable both chat bots and human agents to display common expressions and emotions that are appropriate to the content of their text messages, while also being sufficiently distinctive to identify the entity or source behind each received chat message, e.g., whether the source is chat bot or human. Thus, as will be demonstrated, the systems and methods of the present invention may be used to make blended chat interaction more customer friendly by maintaining visual continuity across different sources, while also imparting information to the customer that facilitates the conversation.

Turning specifically to FIGS. 5 through 9, an example of a blended chat interaction is provided in accordance with embodiments of the present invention. In each illustration, an exemplary webpage 300 is shown. The webpage 300, for example, may be included within a business or enterprise website and include features for initiating interaction between prospective customers or other end users visiting the webpage and the contact center associated with the enterprise. The webpage 300 may be accessed by a customer via a customer device. As shown, a portion of the webpage 300 may include a customer chat feature (or, simply, a chat feature) 305, the functionality of which may be implemented by the systems and components described above.

In an embodiment, as shown, the chat feature 305 includes a user interface generated on a screen of the customer device. This user interface of the chat feature 305 will be referred to herein as a customer chat interface 310. The customer chat interface 310, for example, may be generated by a customer interface module of a chat server, as already described. The customer interface module may send signals to the customer device that are configured to generate a desired customer chat interface 310 in accordance with the content of a chat message issued by a chat source, e.g., a chat bot or human agent. Though other configurations are possible, the customer chat interface 310 may be contained within a designated window, with that window covering or appearing to overlap a designated portion of the webpage 300.

To facilitate certain functionality, the customer chat interface 310 may be arranged in a particular manner. For example, the customer chat interface 310 may be configured to include a text display area 315, which is the area dedicated to the textual display of received and sent text messages. Thus, the text display area 315 may include the text of those messages that are: a) received by the customer (referred to herein as received chat messages or, simply, received message 320; and b) those messages sent by the customer (referred to herein as sent chat messages or, simply, sent messages 325). The text display area 315 may be configured with a scrolling feature so that the text display of more current messages displaces that of prior messages, pushing the prior messages in a scroll direction, the effect of which generally results in only the text of the most current portion of the chat conversation being visible. Further, the scrolling feature results in the text of the most current or recent of the received messages residing in a lead position relative to those messages previously received by the customer. As also shown, within the text display area 315, the received messages 320 and the sent messages 325 may be arranged chronologically (i.e., by the time each message was received and sent, respectively) and differentiated from each other by a positional offset and/or other indicators, such as background color, text font, text color, and the like.

The customer chat interface 310 may be configured to include a text input area, which is the area dedicated to the input of text by the customer for preparing a chat message to send to the contact center. Though other configurations are also possible, the text input area may be positioned in proximity to and/or below the text display area 315.

In accordance with embodiments of the present invention, the customer chat interface 310 may further include an area for displaying a source-informative animation 350. As used herein, a source-informative animation 350 may include non-textual graphics and/or animations that provide information to the customer about the source of a chat message, including: a) the type of source (or particular one within a type) that is behind a received message; and b) an expression or emotion (or, as referred to herein, a conversational state) that corresponds to the nature or emotional state of a received message given the context of the conversation with the customer.

Further, in accordance with embodiments of the present invention, the source-informative animation 350 may include one or more of the following characteristics, each of which will be discussed in more detail below in relation to the illustrated examples. First, according to an embodiment, the source-informative animation 350 is displayed within the customer chat interface 310 so that it visually relates to a corresponding one of the customer's received messages 330. For example, the source-informative animation 350 may be displayed so that it visually relates to the most recently received of the received messages 330. This visual relationship between the source-informative animation 350 and the most recent received of the received messages 330, for example, may be achieved via spatial proximity, common horizontal or vertical alignment, coloring, and other appearance similarities. Second, the source-informative animation 350 may provide information regarding whether the source of a received message 320 is an automated chat module (i.e., chat bot) or a human agent. However, as will also be seen, the source-informative animation 350 also may be configured with common visual attributes across both chat bot and human sources so to lend visual consistency to a blended chat interaction. Third, the source-informative animation 350 may provide information regarding an emotional or conversational state of the source when issuing the chat messages, with the conversational state being instructive as to the type of message and/or emotion or expression of the source in sending the message. For example, the conversational state may depict that, in sending the message, the source is welcoming, questioning, curious, confused, proud, disappointed, etc. Fourth, the source-informative animation 350 may include an animation in which shapes and other graphical elements animate or move or morph between non-moving or still pictures or graphics (referred to as graphic stills). Thus, an animation may animate between a "first graphic still" and a "second graphic still" (also referred to as a "beginning graphic still" and an "ending graphic still"), as will be discussed more in relation to FIGS. 10-13. The animated movement depicted in a source-informative animation 350 further may be used to assist in conveying the previously mentioned emotional or conversational state information. Fifth, the source-informative animation 350 may take the form of several geometric shapes—such as circles—of different sizes that form recognizable emotional states or expressions via the relative position and movement of them.

In regard to the animated movement within the source-informative animation 350, it should be understood that the animation may be used to cycling between graphic stills, with the graphic stills reflecting the changing conversational state of subsequently delivered chat messages. For example, in an example of operation, a first animation may be triggered by an incoming chat message being delivered to a customer from a source (e.g., a chat bot or human agent). In this example, the triggered animation is selected so to change or morph a beginning graphic still, which is the graphic still that corresponds to the conversational state of a preceding chat message, into an ending graphic still, which is the graphic still that corresponds to the conversational state of the incoming chat message. It will be appreciated that between the delivery of incoming messages from the contact center, the graphic still that remains visible matches the most recent of the received messages 320.

Figure 5:
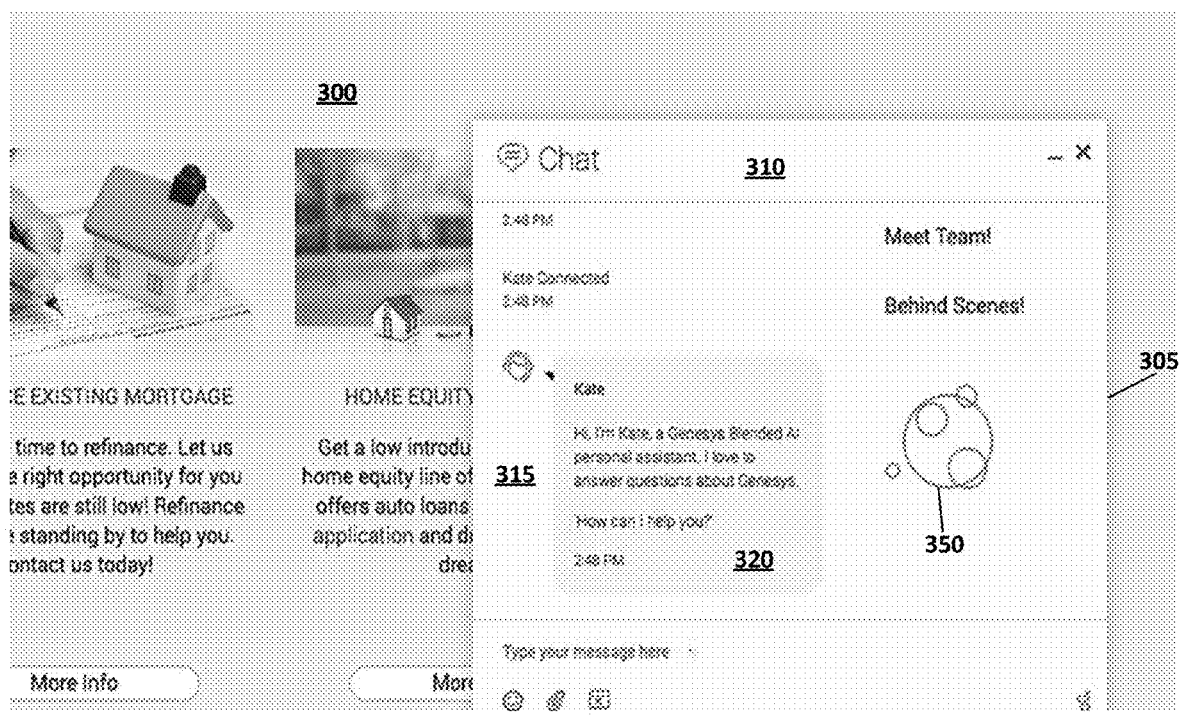
FIG. 5 is an exemplary customer chat interface according to embodiments of the present invention.

Returning to the example blended interaction of FIGS. 5 through 9, the customer begins in FIG. 5 on the webpage 300 by engaging a chat bot in the customer chat interface 310. The chat bot presents itself in the customer chat interface 310 as "Kate". The chat bot Kate may be the source of the received message 320 shown on the customer chat interface 310 that states "Hi, I'm Kate, a Blended AI personal assistant. I love to answer questions about Genesys. How can I help you?" This received message 320 may be displayed with an accompanying source-informative animation 350. In an embodiment, the source-informative animation 350 may include a graphic still, such as the one shown in FIG. 5, that gives a welcoming expression to the customer that matches the intent of the welcoming message from the chat bot Kate. In accordance with example embodiments, the source-informative animation 350 includes an animation that ends in the graphic still shown in FIG. 5. As will be discussed more below, the source-informative animation 350 may include animated movement depicting a first graphic still (not shown) changing or morphing into a second graphic still, such as the one shown in FIG. 5. Both the animated movement and the second graphic still may provide a welcoming feeling that matches the conversational stat or the received chat message from the chat bot Kate.

Figure 6:
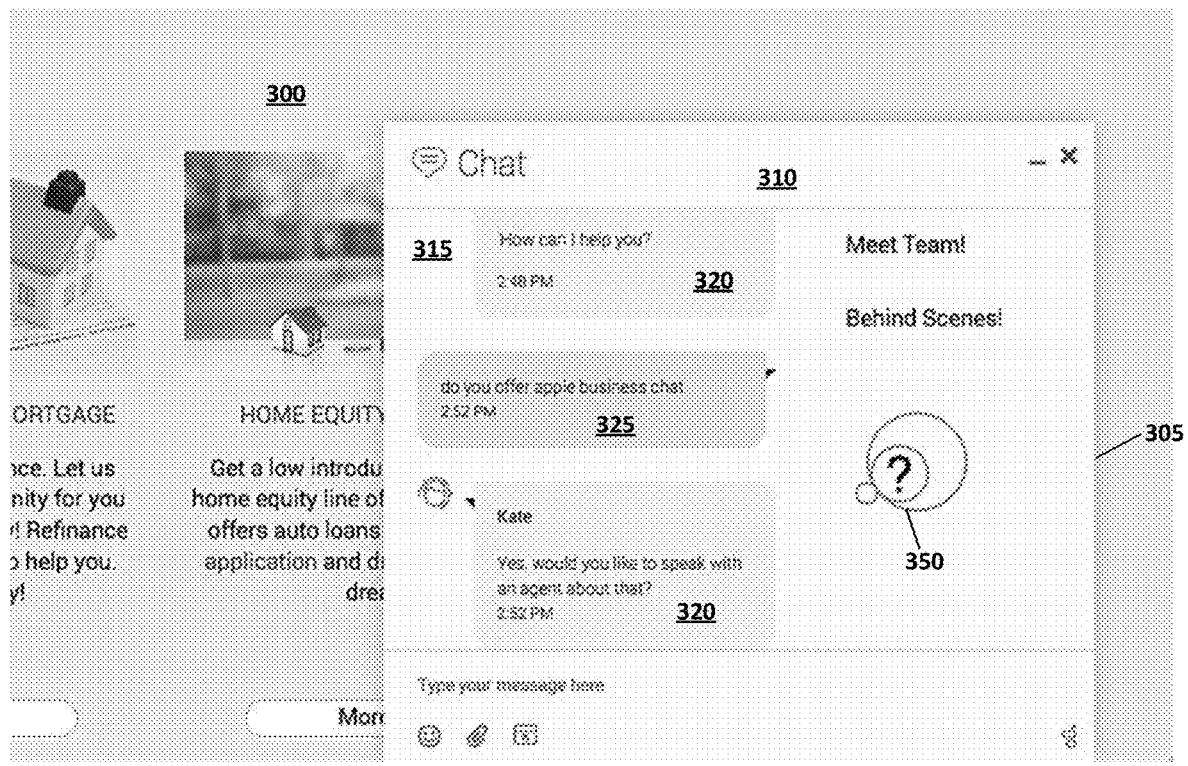
FIG. 6 is an exemplary customer chat interface according to embodiments of the present invention.

As shown in FIG. 6, the example chat interaction continues with the customer responding with a sent message 325 that is delivered to the chat bot Kate. In the example illustrated, the sent message 325 reads: "Do you offer Apple Business Chat?" In response to this, the chat bot Kate may perform an automated search of a knowledge base to determine an appropriate answer. Once the answer is determined, the chat bot Kate sends it to the customer: "Yes, would you like to speak to an agent about that?" To accompany this new incoming message, i.e., the received message 320 from the chat bot Kate, a new source-informative animation 350 is provided. In this case, the source-informative animation 350 may include a graphic still that gives a curious or questioning conversational state to customer, which, for example, may be conveyed via a question mark integrated into the circular shapes. The source-informative animation 350 also may include an animation in which a first graphic still animates or morphs into a second graphic still, thereby conveying the changing conversational state of chat messages. In accordance with an exemplary embodiment, the first graphic still of this animation may be the previous welcoming graphic still of the preceding chat message (i.e., the one shown in FIG. 5), while the second graphic still is the one shown in FIG. 6, which provides the curious or questioning impression to the customer that corresponds to the present conversational state given the chat bot Kate's latest mes sage.

Figure 7:
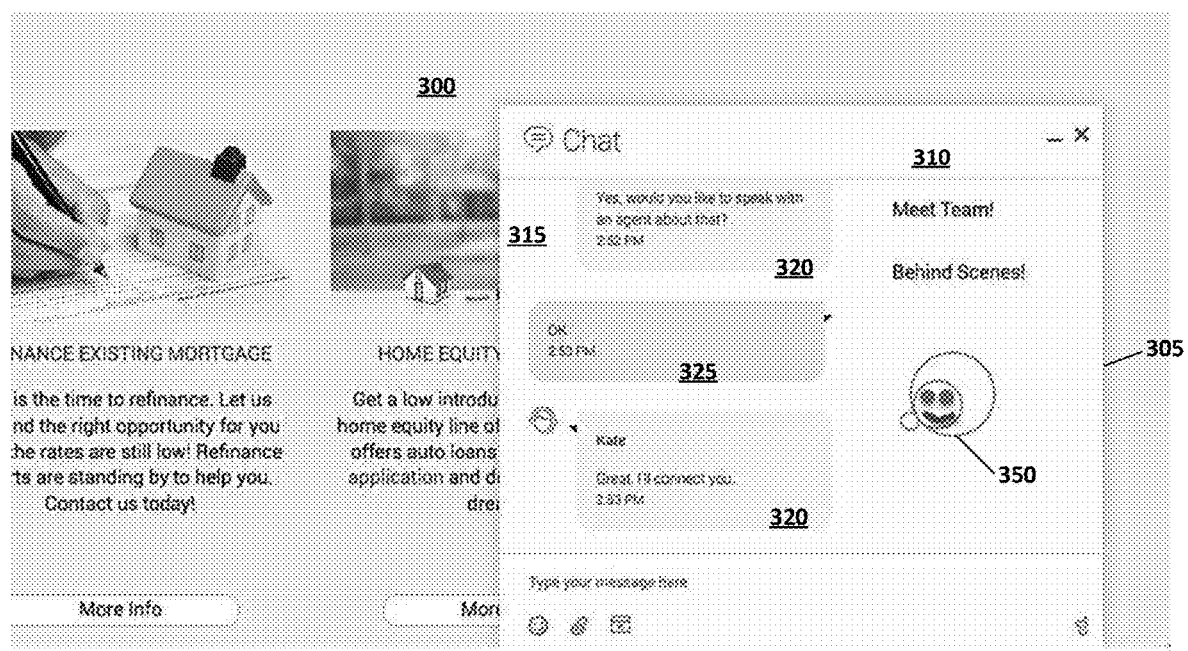
FIG. 7 is an exemplary customer chat interface according to embodiments of the present invention.

Continuing to FIG. 7, the sent message 325 of the customer is "Yes", which prompts the chat bot Kate to respond with the received message 320 that states "Great, I'll connect you." To accompany this received message 320, the source-informative animation 350 may include a graphic still that expresses a conversational state that expresses thankfulness or pride. This, for example, may be conveyed via a happy face integrated into the circular shapes, though other configurations are also possible. The source-informative animation 350 also may include an animation in which a first graphic still animates or morphs into a second graphic still, thereby conveying the changing conversational state of chat messages. In accordance with an exemplary embodiment, the first graphic still may have been the previous questioning graphic still of the preceding chat message (shown in FIG. 6), while the second graphic still is the one shown in FIG. 7, which provides the thankful or happy impression to the customer that corresponds to the present conversational state given Kate's latest chat message.

Now the chat communication with the customer is transferred to a human agent, which is "Mark". As shown, in FIGS. 8 and 9, the chat conversation continues with source-informative animations 350 using the same overall design structure that uses the same component elements i.e., the same circular shapes and arrangements of those shapes but incorporates different visual effects for those components (referred to as component effects) that reflect the transfer to a new source. In this case, the component effects of the source-informative animation 350 reflect a personalization—changing the circles to tennis balls that reflects that the source is different than the one that delivered the previous message and/or that the source is now a human agent, i.e., human agent Mark. According to example embodiments, the component effects may include fill color, fill pattern, and border or line thickness characteristic used to render component elements within the overall design structure.

In this way, in accordance with the present invention, the source-informative animations 350 across different sources include consistent visual elements, such as overall design structure, that promote consistency to the user interface during blended interactions, while also including visual clues via differing component effects that inform as to the source generating the messages received by the customer. Thus, as shown in FIGS. 8 and 9, though the source-informative animations 350 has been personalized to indicate change from a chat bot source to a human source, the overall design structure, including the circular shapes being used in the graphic stills, remain the same.

Figure 8:
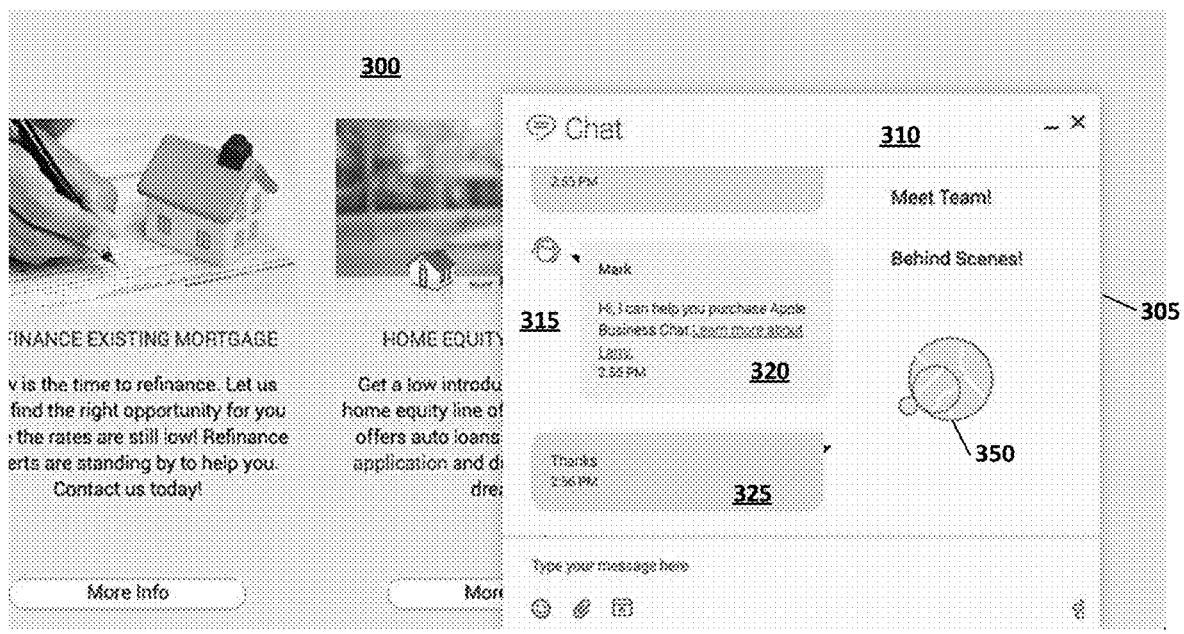
FIG. 8 is an exemplary customer chat interface according to embodiments of the present invention.
Figure 9:
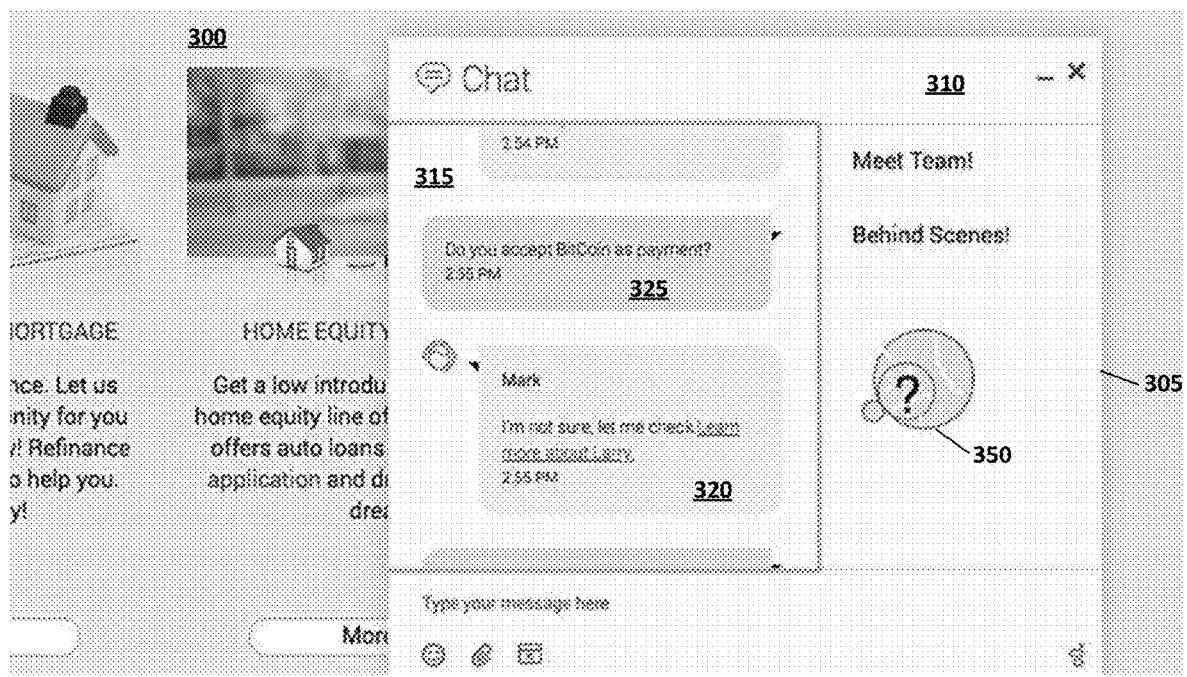
FIG. 9 is an exemplary customer chat interface according to embodiments of the present invention.

As shown in FIG. 8, the graphic still reflects a "welcoming" expression that reflects a conversational state that corresponds to the received message 320 from the human agent Mark, which states, "Hi, I see you are interested in Apple Business Chat. Let's talk about pricing?" In response to this, as shown in FIG. 9, the customer sends the message that reads "Do you accept Bitcoin as payment?" As illustrated, the human agent Mark then replies to this question: "I'm not sure, let me check". In this case, the source-informative animation 350 that accompanies the message may include an animation that morphs the graphic stills from the preceding "welcoming" graphic still (of FIG. 8) to the "questioning" graphic still (of FIG. 9), which is consistent with the human agent Mark being unsure about the answer and/or querying internal resources in order to answer the pending question from the customer.

In other embodiments, an emotion or conversational state that may be used in the animations and/or graphic stills of the source-informative animation 350 is a "proud" expression, which could be used when the source is able to send a message of a strong affirmation, for example, to let the customer know about a service that the enterprise is proud to offer. In other embodiments, a conversational state that may be used in the animations and/or graphic stills of the source-informative animation 350 is a "thinking" expression, which could be used when the source sends a message to the customer indicating that the customer's situation or question is being further considered. In yet other embodiments, a conversational state that may be used in the animations and/or graphic stills of the source-informative animation 350 is a "disappointment" or "failure" expression, which could be used when the source sends a message to the customer indicating that the source is unable to find an answer to the customer's question or fulfill a request made by the customer. Other expressions or conversational states may include a "hello" expression, "confused" expression, "farewell" expression, and the like.

Figure 10:
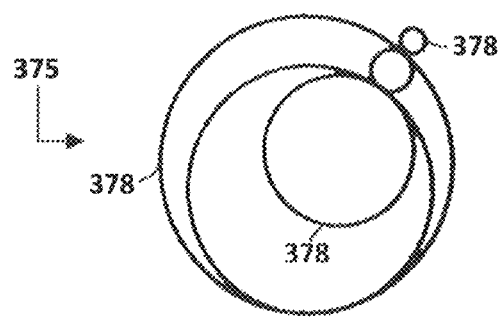
FIG. 10 is an exemplary graphic still according to embodiments of the present invention.
Figure 11:
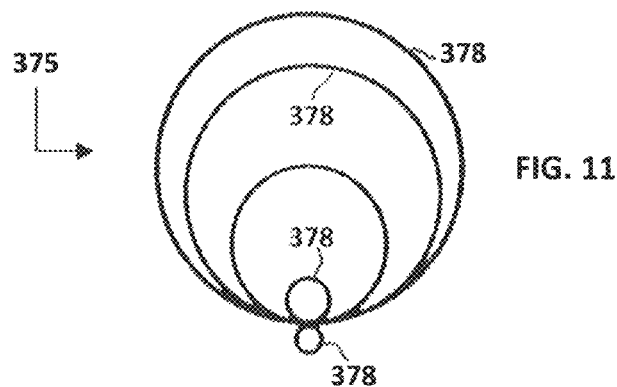
FIG. 11 is an exemplary graphic still according to embodiments of the present invention.
Figure 12:
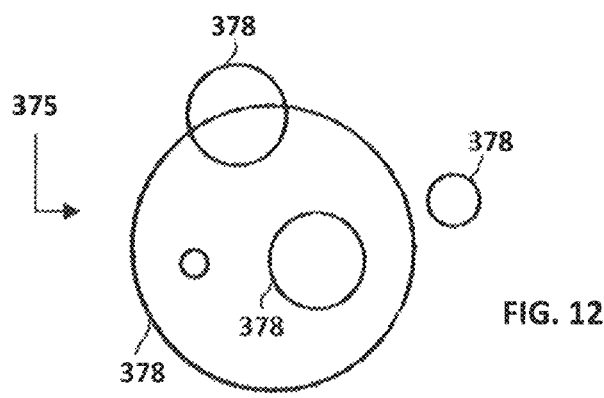
FIG. 12 is an exemplary graphic still according to embodiments of the present invention.

Turning now to FIGS. 10-12, several graphic stills 375 are shown that may be used in source-informative animations. In accordance with an embodiment, the graphic stills 375 may include geometric shapes—for example, the different sized circular shapes 378 that are shown-which are arranged in fixed positions that form a particular arrangement. Though other types of arrangements are possible, the arrangement of the circular shapes 378 in the graphic still 375 in FIG. 10, for example, may be intended to reflect a "proud" expression or conversational state. The arrangement of the circular shapes 378 in the graphic still 375 in FIG. 11, for example, may be intended to reflect a "disappointment" conversational state. And, finally, the arrangement of the circular shapes 378 in the graphic still 375 in FIG. 12 may be intended to reflect a "welcoming" conversational state. It should be appreciated that other configurations or arrangements may be used to illustrate the various conversational states, as may be deemed appropriate given the anticipated customers of an enterprise. Additionally, in certain embodiments, the geometric shapes of the graphic stills 375 may be configured to resemble the corporate logo of the enterprise with which the customer is interacting. This may be done with the use of distinctive coloring and alteration in shape that make the resulting geometric shapes resemble the relevant corporate logo.

Figure 13:
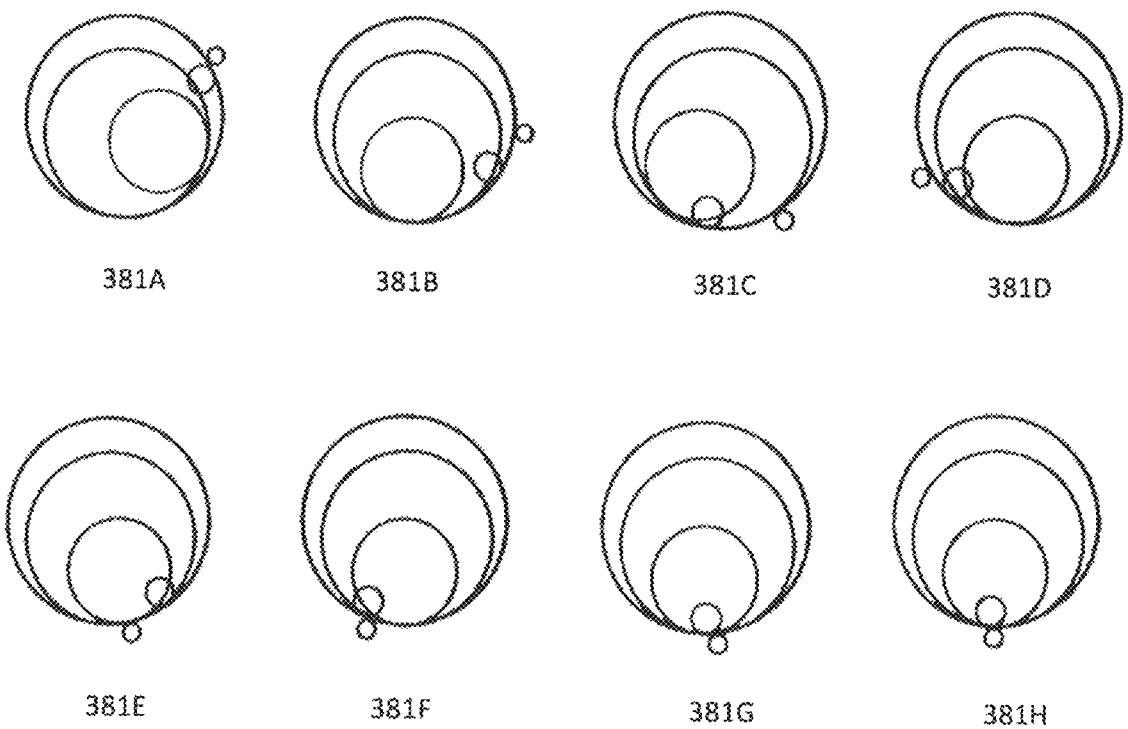
FIG. 13 is a series of snapshots illustrating the progression of an exemplary source-informative animation according to embodiments of the present invention.

With reference to FIG. 13, a series 380 of snapshots proceeding from 381A to 381H is provided that illustrates the progression of an exemplary source-informative animation according to embodiments of the present invention. As stated, the first source-informative animation may include a first graphic still morphing or changing into a second graphic still. As will be appreciated, in the case of the illustrated example, the first or beginning graphic still is the "proud" conversational state of the graphic still 375 shown in FIG. 10, while the second or ending graphic still is the "disappointment" conversational state of the graphic still 375 shown in FIG. 11. As the progression of the snapshots 381 shows, the several circles begin in what can be described as an upright or "proud" posture that then animates or transitions toward an ending posture that has a down or "disappointed" feel. Further, the animated movement is configured so that in attaining the ending "disappointed" posture, the collection of circles moves in a way that suggests a drooping or limp state, which is consistent with disappointment. Specifically, remaining tangent to the largest circle, several of the smaller circles drift downward and then oscillate back and forth before finally coming to rest at a low point. In this way, the source-informative animation may be configured so that the movement of the shapes also suggests the change in the conversational state that is taking place, i.e., a change from "proud" to "disappointed".

Figure 14:
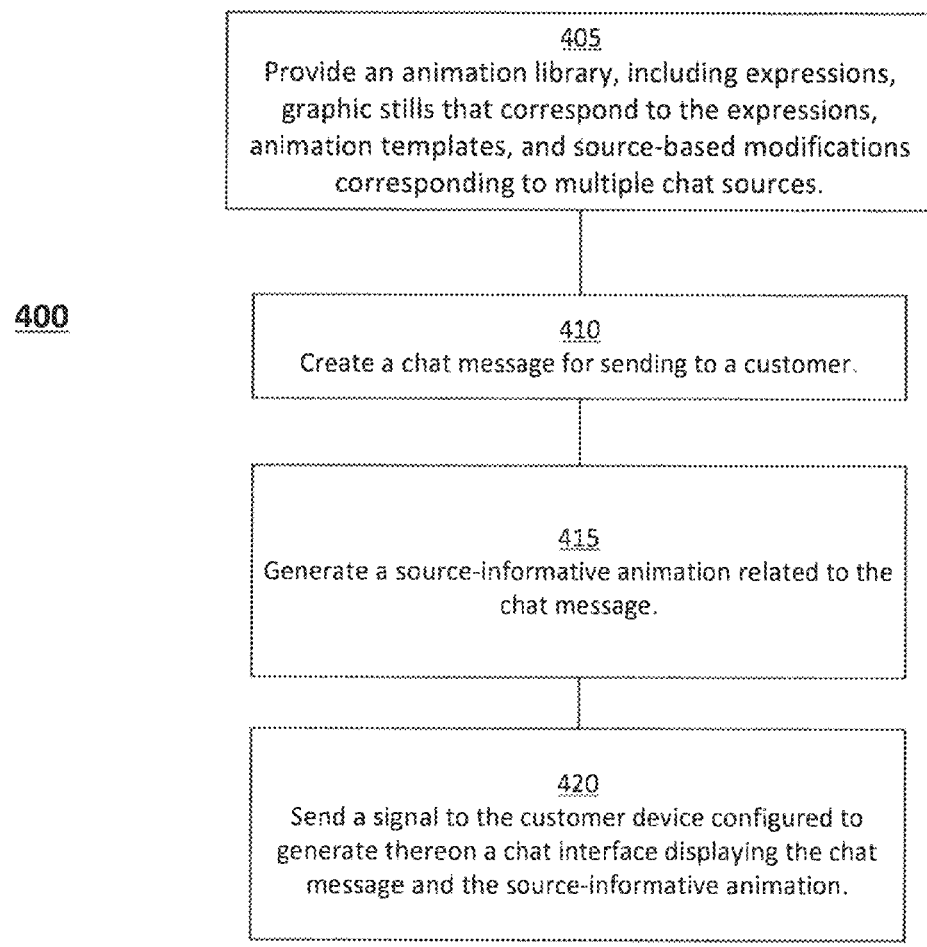
FIG. 14 is a flow diagram illustrating a method of orchestrating a blended chat interaction according to embodiments of the present invention.

With reference to FIG. 14, embodiments of the present invention may include a method 400 for orchestrating a blended chat interaction with a customer in which chat messages originating from multiple sources are sent to the customer. Specifically, the method 400 provides an example as to how source-informative graphics may be generated.

As shown, the method 400 may begin at step 405 that includes providing an animation library. The animation library, which may be formulated as a database stored on the previously described storage devices, may include a listing of conversational states, with each of the conversational states providing an emotion classification by which chat messages are classified. The animation library may further include graphic stills that correspond to respective ones of the conversational states. The animation library may further include animations (or animation templates), with each of the animation templates including an animation in which one of the graphic stills morphs or changes or animates into another one of the graphic stills. Finally, the animation library may include source-based modifications that correspond to respective ones of the multiple sources. More specifically, the source-based modifications may include instructions for modifying the animation templates in a manner that makes the resulting or modified animations for each of the multiple sources unique in appearance relative to the modified animations of the other of the multiple sources.

Operation of method 400 may continue to step 410 where a chat message (which, for the sake of this example, will be designated as a first chat message) is created for sending to a customer.

At step 415, in response the creation of the first chat message, a source-informative animation (designated in this example as a first source-informative animation) may be generated for displaying along with the first chat message once it is sent to the customer. In exemplary embodiments, the following steps may be used to generate the first source-informative animation.

First, a source of the first chat message may be determined. For this example, the source of the first chat message is designated as a first source.

Second, a conversational state for the first chat message is determined. For this example, the conversational state determined for the first chat message is designated as a first conversational state.

Third, a graphic still for the first chat message is selected. This selection may be based on determining which of the graphic stills in the animation library corresponds to the first conversational state. For this example, the graphic still selected for the first chat message is designated as a first graphic still.

Fourth, an animation template for the first chat message is selected. This selection may be based, at least in part, on what graphic still was previously selected as the first graphic still. This is because the selected animation template should incorporate the first graphic still in its animation. For this example, the animation template selected for the first chat message is designated as a first animation template.

Fifth, a source-based modification is selected. The selection of the source-based modification is based on the identity of the source of the chat message. Thus, in this case, the source-based modification that corresponds to the first source is selected. For this example, the selected source-based modification is designated as a first source-based modification.

Sixth, the first animation template may be modified pursuant to the first source-based modification. In this way, the first animation template is modified in a unique way so to generate the first source-informative animation, which can then be coupled to the first chat message to provide information about the source of the first chat when it is presented to the customer.

With the first source-informative animation generated, the method 400 may proceed to step 420. At step 420, a signal is sent to the customer device of the customer, with the signal being configured to generate a chat interface (referred to in this example as a first chat interface) that includes the display of both the first chat message and the first source-informative animation.

As will be appreciated, the general steps of the method 400 may be repeated as new chat messages are created by the available sources. Thus, in response to the creation of the second chat message, another source-informative animation (or, continuing with the example, a second source-informative animation) may be generated via the following steps, which have been abbreviated from the steps just described. A source of the second chat message is determined, which will be designated as a second source. Then, a conversational state for the second chat message is determined, which will be designated as a second conversational state. Then, a graphic still for the second chat message will be selected, which will be designated as a second graphic still. As before, this selection may be based on which of the graphic stills in the animation library corresponds to the second conversational state. As a next step, an animation template is selected for the second chat message based at least in part on the selection of the second graphic still, with the one selected being designated as a second animation template. After this, a source-based modification is selected, which is based on the source of the chat message. Thus, the source-based modification that corresponds to the second source is selected, which is designated as a second source-based modification. Once this is done, the second animation template is modified pursuant to the second source-based modification, thereby generating the second source-informative animation. The second source-informative animation can then be provided along with the second chat message within a second chat interface.

The above-described method of the present invention may be used in different contexts and include alternative features. Drawing upon the disclosures already made and continuing with the above example that includes the creation of the first source-informative animation and the second source-informative animation, these embodiments will now be described.

According to example embodiments, the multiple sources may include one or more chat bots and/or one or more human agents. For example, the first source may be a chat bot, and the second source may be a human agent. Alternatively, the first source may be a first chat bot, and the second source may be a second chat bot. Further, the first source may be a first human agent, and the second source may be a second human agent. According to example embodiments, the signals for the first chat interface and the second chat message may be sent to the customer device during a single and continuous chat session.

According to example embodiments, the first and second chat interfaces may be configured such that the source-informative animation is visual related to the chat message. For example, as shown in the examples of FIGS. 5-9, this may be done via a close horizontal proximity between the two elements on the screen of the customer device. Also, as provided in the illustrations, this may be done via a common vertical alignment between the two elements.

According to example embodiments, the first graphic still may include geometric shapes arranged in fixed positions that form a first arrangement. In such cases, the first source-informative animation may include a movement of the geometric shapes that results in the geometric shapes attaining the fixed positions of the first arrangement. Likewise, the second graphic still may include the same geometric shapes arranged in fixed positions that form a second arrangement, with the second source-informative animation including movement of those geometric shapes that results in the geometric shapes attaining the fixed positions of the second arrangement. In each case, the geometric shapes may include multiple different-sized circles. In exemplary embodiments, the first graphic still and the second graphic still each includes a graphical representation of one of the following conversational states: hello; happy; proud; confused; curious; questioning; thankful; disappointment; failure; thinking; and farewell.

The visual designs of the first source-informative animation and the second source-informative animation may be describable by: an overall design structure, which includes a size and a shape of component elements; and component effects, which include a manner in which the component elements are graphically presented. According to example embodiments, a comparison of the visual designs of first source-informative animation and the second source-informative animation may include one or more consistent visual elements and one or more different visual elements. The one or more consistent visual elements may include the overall design structure, while the one or more different visual elements include the component effects. According to example embodiments, the component elements of both the first source-informative animation and the second source-informative animation may include multiple same-shaped but different-sized geometric shapes. In such cases, the one or more different component effects may include at least one of a fill color, a fill pattern, and a line thickness used in rendering the geometric shapes. In an embodiment, the one or more different visual effects between the first source-informative animation and the second source-informative animation are configured to inform the customer that the chat messages accompanied by each originated from a different source. As will be appreciated, the chat bot may be classified as an artificial intelligence (AI) source, while the agent is a human intelligence source. In exemplary embodiments, the one or more different visual effects between the first source-informative animation and the second source-informative animation are configured to inform the customer that the chat messages accompanied by each originated from a different intelligence source.

In the example provided above, it should be understood that the first chat message and the second chat message may be consecutive chat messages sent to the customer. Additionally, in some instances, the first animation template and the second animation template may be the same animation template. In such case, the consistency in the overall design structure between the first source-informative animation and the second source-informative animation may further include the manner in which the component elements are arranged and/or move in relation to each other.

The step of determining the conversational state, i.e., the emotion classification, of a chat message may be completed in various ways, including the use of conventional technologies. In exemplary embodiments, the step of determining a conversational state for a chat message from a human agent may include receiving an input from the human agent whereby the human agent selects an appropriate conversational state from among a plurality of choices. Alternatively, the determination of the conversational state may be completed by an automated textual analysis of the chat message from a human agent. Further, according to example embodiments, the chat bot is an automated chat module that includes a list of predetermined chat messages. In such cases, for example, the chat message from the chat bot may be one selected from a list of predetermined chat messages that are available to the chat bot in various context. Each of the predetermined chat messages may include a predetermined emotion classification or conversational state. As such, the step of determining the conversational state for a chat message from the chat bot may include receiving the predetermined classification that corresponds with that chat message.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected. Hence, the proper scope of the present invention should be determined only by the broadest interpretation of the appended claims so as to encompass all such modifications as well as all relationships equivalent to those illustrated in the drawings and described in the specification.

The invention claimed is:

1. A processor-implemented method for orchestrating a chat interaction with a customer, wherein, during the chat interaction, chat messages originating from multiple sources are sent to the customer, the processor-implemented method comprising the steps of:
providing an animation library that includes:
conversational states, each of the conversational states comprising an emotion classification by which the chat messages originating from the multiple sources are classified;
graphic stills corresponding to respective ones of the conversational states;
animation templates, each animation template including one of the graphic stills morphing into another one of the graphic stills; and
source-based modifications corresponding to respective ones of the multiple sources, wherein each of the source-based modifications comprises instructions for modifying the animation templates to make a modified one of the animation templates for one of the multiple sources unique in appearance relative to modified ones of the animation templates for the other of the multiple sources;
in response to a creation of a first chat message for sending to the customer, generating a first source-informative animation using the following steps:
determining a source of the first chat message, wherein the source determined for the first chat message is designated as a first source;
determining a conversational state for the first chat message, wherein the conversational state determined for the first chat message is designated as a first conversational state;
selecting a graphic still for the first chat message based on which of the graphic stills corresponds with the first conversational state, wherein the graphic still selected for the first chat message is designated as a first graphic still;
selecting an animation template for the first chat message based at least in part on the selection of the first graphic still, wherein the animation template selected for the first chat message is designated as a first animation template;
selecting a source-based modification that corresponds to the first source, wherein the source-based modification that corresponds to the first source is designated as a first source-based modification; and
modifying the first animation template pursuant to the first source-based modification so to generate the first source-informative animation;
sending a signal to a customer device of the customer configured to generate thereon a first chat interface, the first chat interface comprising a display of the first chat message and the first source-informative animation.

2. The processor-implemented method of claim 1, wherein the multiple sources comprise a second source; and wherein:
the first source comprises one of a chat bot and a human agent;
the second source comprises the other one of the chat bot and the human agent;
wherein the first chat interface is configured such that the first source-informative animation is visual related to the first chat message via a close horizontal proximity and common vertical alignment.

3. The processor-implemented method of claim 1, further comprising the steps of:
in response to a creation of a second chat message for sending to the customer, generating a second source-informative animation using the following steps:
determining a source of the second chat message, wherein the source determined for the second chat message is designated as a second source;
determining a conversational state for the second chat message, wherein the conversational state determined for the second chat message is designated as a second conversational state;
selecting a graphic still for the second chat message based on which of the graphic stills corresponds with the second conversational state, wherein the graphic still selected for the second chat message is designated as a second graphic still;
selecting an animation template for the second chat message based at least in part on the selection of the second graphic still, wherein the animation template selected for the second chat message is designated as a second animation template;
selecting a source-based modification that corresponds to the second source, wherein the source-based modification that corresponds to the second source is designated as a second source-based modification; and
modifying the second animation template pursuant to the second source-based modification so to generate the second source-informative animation;
sending a signal to the customer device of the customer configured to generate thereon a second chat interface, the second chat interface including a display of the second chat message and a playing of the second source-informative animation.

4. The processor-implemented method of claim 3, wherein the signals for the first chat interface and the second chat message are sent to the customer device of the customer during a single and continuous chat session; and wherein:
the first source comprises a chat bot; and
the second source comprises a human agent.

5. The processor-implemented method of claim 4, wherein visual designs of the first source-informative animation and the second source-informative animation are describable by: an overall design structure, which includes a size and a shape of component elements; and component effects, which includes a manner in which the component elements are graphically presented;
   wherein a comparison of the visual designs of first source-informative animation and the second source-informative animation includes one or more consistent visual elements and one or more different visual elements; and
   wherein:
      the one or more consistent visual elements comprises the overall design structure; and
      the one or more different visual elements comprises the component effects.

6. The processor-implemented method of claim 5, wherein the component elements of both the first source-informative animation and the second source-informative animation comprise multiple same-shaped but different-sized geometric shapes; and
   wherein the component effects comprise at least one of a fill color, a fill pattern, and a line thickness used in rendering the geometric shapes.

7. The processor-implemented method of claim 5, wherein the first animation template and the second animation template comprise the same animation template; and
   wherein the overall design structure of the first source-informative animation and the second source-informative animation is further describable by a manner in which the component elements are arranged and/or move in relation to each other.

8. The processor-implemented method of claim 5, wherein the one or more different visual effects between the first source-informative animation and the second source-informative animation are configured to inform the customer that the chat messages accompanied by each originated from a different source;
   wherein the first graphic still and the second graphic still each comprises a graphical representation of one of the following emotional states: hello; happy; proud; confused; curious; questioning; thankful; disappointment; failure; thinking; and farewell; and
   wherein the first chat message and the second chat message comprise consecutive chat messages sent to the customer.

9. The processor-implemented method of claim 5, wherein the chat bot is classified as an artificial intelligence source, and the human agent is classified as a human intelligence source; and
   wherein the one or more different visual effects between the first source-informative animation and the second source-informative animation are configured to inform the customer that the chat messages accompanied by each originated from a different classification of intelligence source.

10. The processor-implemented method of claim 4, wherein the chat bot is defined as an automated chat module;
   wherein:
      the first chat message is selected from a list of predetermined chat messages available to the chat bot, each of the predetermined chat messages comprising a predetermined conversational state; and
      the step of determining the conversational state for the first chat message comprises receiving the predetermined conversational state that corresponds to the first chat message.

11. The processor-implemented method of claim 4, wherein the step of determining the second conversational state for the second chat message from the human agent comprises one of:
   receiving an input from an agent device made by the human agent selecting the conversational state from among a plurality of choices; and
   an automated textual analysis of the second chat message.

12. The processor-implemented method of claim 4, wherein the first graphic still comprises geometric shapes arranged in fixed positions that form a first arrangement, and wherein the first source-informative animation comprises a movement of the geometric shapes that results in the geometric shapes attaining the fixed positions of the first arrangement; and
   wherein the second graphic still comprises the geometric shapes arranged in fixed positions that form a second arrangement, and wherein the second source-informative animation comprises a movement of the geometric shapes that results in the geometric shapes attaining the fixed positions of the second arrangement.

13. The processor-implemented method of claim 12, wherein the geometric shapes comprise multiple different-sized circles.

14. The processor-implemented method of claim 12, wherein the geometric shapes comprise a corporate logo.

15. The processor-implemented method of claim 12, wherein the first chat message and the second chat message comprise consecutively sent chat messages; and
   wherein the second source-informative animation morphs the first graphic still, which corresponds to the conversational state of the first chat message, into the second graphic still, which corresponds to the conversational state of the second chat message.

16. A system for orchestrating a chat interaction with a customer, wherein, during the chat interaction, chat messages originating from multiple sources are sent to the customer, the system comprising:
   a hardware processor; and
   a machine-readable storage medium on which is stored instructions that cause the hardware processor to execute a process, wherein the process comprises the steps of:
      providing an animation library that includes:
         conversational states, each of the conversational states comprising an emotion classification by which the chat messages originating from the multiple sources are classified;
         graphic stills corresponding to respective ones of the conversational states;
         animation templates, each animation template including one of the graphic stills morphing into another one of the graphic stills; and
         source-based modifications corresponding to respective ones of the multiple sources, wherein each of the source-based modifications comprises instructions for modifying the animation templates to make a modified one of the animation templates for one of the multiple sources unique in appearance relative to modified ones of the animation templates for the other of the multiple sources;
      in response to a creation of a first chat message for sending to the customer, generating a first source-informative animation using the following steps:
         determining a source of the first chat message, wherein the source determined for the first chat message is designated as a first source;

determining a conversational state for the first chat message, wherein the conversational state determined for the first chat message is designated as a first conversational state;

selecting a graphic still for the first chat message based on which of the graphic stills corresponds with the first conversational state, wherein the graphic still selected for the first chat message is designated as a first graphic still;

selecting an animation template for the first chat message based at least in part on the selection of the first graphic still, wherein the animation template selected for the first chat message is designated as a first animation template;

selecting a source-based modification that corresponds to the first source, wherein the source-based modification that corresponds to the first source is designated as a first source-based modification; and modifying the first animation template pursuant to the first source-based modification so to generate the first source-informative animation;

sending a signal to a customer device of the customer configured to generate thereon a first chat interface, the first chat interface comprising a display of the first chat message and the first source-informative animation.

17. The system according to claim 16, wherein the process further comprises the steps of:

in response to a creation of a second chat message for sending to the customer, generating a second source-informative animation using the following steps:

determining a source of the second chat message, wherein the source determined for the second chat message is designated as a second source;

determining a conversational state for the second chat message, wherein the conversational state determined for the second chat message is designated as a second conversational state;

selecting a graphic still for the second chat message based on which of the graphic stills corresponds with the second conversational state, wherein the graphic still selected for the second chat message is designated as a second graphic still;

selecting an animation template for the second chat message based at least in part on the selection of the second graphic still, wherein the animation template selected for the second chat message is designated as a second animation template;

selecting a source-based modification that corresponds to the second source, wherein the source-based modification that corresponds to the second source is designated as a second source-based modification; and modifying the second animation template pursuant to the second source-based modification so to generate the second source-informative animation;

sending a signal to the customer device of the customer configured to generate thereon a second chat interface, the second chat interface including a display of the second chat message and a playing of the second source-informative animation.

18. The system according to claim 17, wherein the signals for the first chat interface and the second chat message are sent to the customer device of the customer during a single and continuous chat session; and wherein the first source comprises a chat bot, and the second source comprises a human agent;

wherein visual designs of the first source-informative animation and the second source-informative animation are describable by: an overall design structure, which includes a size and a shape of component elements; and component effects, which includes a manner in which the component elements are graphically presented;

wherein a comparison of the visual designs of first source-informative animation and the second source-informative animation includes one or more consistent visual elements and one or more different visual elements; and wherein:

the one or more consistent visual elements comprises the overall design structure; and the one or more different visual elements comprises the component effects.

19. The system according to claim 17, wherein the first graphic still comprises geometric shapes arranged in fixed positions that form a first arrangement, and wherein the first source-informative animation comprises a movement of the geometric shapes that results in the geometric shapes attaining the fixed positions of the first arrangement; and wherein the second graphic still comprises the geometric shapes arranged in fixed positions that form a second arrangement, and wherein the second source-informative animation comprises a movement of the geometric shapes that results in the geometric shapes attaining the fixed positions of the second arrangement.

20. The system according to claim 17, wherein the first chat message and the second chat message comprise consecutively sent chat messages; and wherein the second source-informative animation morphs the first graphic still, which corresponds to the conversational state of the first chat message, into the second graphic still, which corresponds to the conversational state of the second chat message.

* * * * *